(12) United States Patent
Tourki et al.

(10) Patent No.: US 11,743,087 B2
(45) Date of Patent: Aug. 29, 2023

(54) DEVICES AND METHODS FOR MULTICARRIER MODULATION SCHEMES

(71) Applicant: Huawei Technologies Co., Ltd., Shenzhen (CN)

(72) Inventors: Kamel Tourki, Boulogne Billancourt (FR); Merouane Debbah, Boulogne Billancourt (FR); Rostom Zakaria, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/526,187

(22) Filed: Nov. 15, 2021

(65) Prior Publication Data
US 2022/0078063 A1 Mar. 10, 2022

Related U.S. Application Data

(63) Continuation of application No. PCT/EP2019/062620, filed on May 16, 2019.

(51) Int. Cl.
*H04L 27/26* (2006.01)
*H04J 13/00* (2011.01)
(Continued)

(52) U.S. Cl.
CPC ...... *H04L 27/2627* (2013.01); *H04J 13/0077* (2013.01); *H04L 5/0001* (2013.01); *H04L 5/023* (2013.01); *H04J 2013/0081* (2013.01)

(58) Field of Classification Search
CPC ... H04L 27/2627; H04L 5/0001; H04L 5/023; H04J 13/0077; H04J 2013/0081; H04B 1/7103

See application file for complete search history.

(56) References Cited

U.S. PATENT DOCUMENTS 5,995,147 A * 11/1999 Suzuki ............... H04N 21/2383
348/720
6,510,175 B1 * 1/2003 Hunsinger ............. H04H 20/30
375/216
(Continued)

FOREIGN PATENT DOCUMENTS

CN 1969522 A * 5/2007 ............. H04B 7/068
CN 101702703 A * 5/2010
(Continued)

OTHER PUBLICATIONS

Sánchez-Fernández et al., "SVM Multiregression for Nonlinear Channel Estimation in Multiple-Input Multiple-Output Systems", IEEE, IEEE Transactions on Signal Processing, vol. 52, No. 8, Aug. 2004 (Year: 2004).*
(Continued)

*Primary Examiner* — Shah M Rahman
(74) *Attorney, Agent, or Firm* — Slater Matsil, LLP.

(57) ABSTRACT

A transmitter device, a receiver device and a transceiver device for a multicarrier modulation scheme. The transmitter device is configured to obtain a plurality of signature roots based on receiving a feedback message from a receiver device, construct a Lagrange matrix or a Vandermonde matrix from the plurality of signature roots, and generate a multicarrier modulated signal based on the Lagrange matrix or the Vandermonde matrix. The receiver device is configured to determine a plurality of signature roots, construct a Lagrange matrix or a Vandermonde matrix from the plurality of signature roots, and perform a demodulation of a multicarrier modulated signal based on the Lagrange matrix or the Vandermonde matrix. The transceiver device comprises a transmitter device configured to generate a multicarrier modulated signal, and a receiver device configured to perform a demodulation of the multicarrier modulated signal.

18 Claims, 19 Drawing Sheets

(51) Int. Cl.
*H04L 5/00* (2006.01)
*H04L 5/02* (2006.01)

(56) References Cited

U.S. PATENT DOCUMENTS

| | | | |
|---|---|---|---|
| 7,190,734 B2 * | 3/2007 | Giannakis | H04L 1/0618 375/267 |
| 7,633,849 B1 * | 12/2009 | Al-Rawi | H04L 25/0228 370/208 |
| 7,706,454 B2 * | 4/2010 | Giannakis | H04B 7/0669 375/371 |
| 10,116,482 B2 | 10/2018 | Yun et al. | |
| 2002/0054609 A1 * | 5/2002 | Laurent | H04H 20/30 370/430 |
| 2005/0105631 A1 | 5/2005 | Giannakis et al. | |
| 2005/0168324 A1 * | 8/2005 | Fischer | G06K 7/10039 340/10.3 |
| 2005/0237236 A1 * | 10/2005 | Budic | G01S 13/5244 342/159 |
| 2006/0133305 A1 * | 6/2006 | Patwardhan | H04H 20/46 370/312 |
| 2006/0227889 A1 | 10/2006 | Uchida et al. | |
| 2007/0155192 A1 * | 7/2007 | Jeng | G01S 3/74 439/13 |
| 2007/0177688 A1 * | 8/2007 | Wu | H04L 1/0606 375/267 |
| 2008/0031314 A1 | 2/2008 | Priotti et al. | |
| 2008/0219372 A1 * | 9/2008 | Hori | H04L 27/2614 375/261 |
| 2009/0117862 A1 * | 5/2009 | Le Nir | H04L 1/0656 455/101 |
| 2016/0261449 A1 | 9/2016 | Yang et al. | |
| 2017/0288911 A1 | 10/2017 | Rusek et al. | |
| 2018/0234149 A1 * | 8/2018 | Zhang | H04B 7/0626 |
| 2020/0028623 A1 * | 1/2020 | Park | H04W 76/27 |

FOREIGN PATENT DOCUMENTS

| | | | | |
|---|---|---|---|---|
| CN | 102970270 A | * | 3/2013 | |
| CN | 104079335 A | | 10/2014 | |
| CN | 105429919 A | | 3/2016 | |
| CN | 107005503 A | | 8/2017 | |
| CN | 109286985 A | | 1/2019 | |
| WO | WO-2009101317 A1 | * | 8/2009 | H04B 1/7097 |
| WO | 2014091198 A1 | | 6/2014 | |

OTHER PUBLICATIONS

Bui; Francis M. "Signal Processing Methodologies for Resource-Efficient and Secure Communications in Wireless Networks", A thesis submitted for the degree of Doctor of Philosophy, Graduate Department of Electrical and Computer Engineering, University of Toronto, Total pp. 188 (Year: 2009).*

Hayes, Matthew, "Distributed Quasi-Orthogonal Space-Time Coding in Wireless Cooperative Relay Networks", Submitted in partial fulfilment of the requirements of the award of Doctor of Philosophy, School of Electronic, Electrical and Systems Engineering, Loughborough University, Total pp. 252 (Year: 2011).*

Asplund, H., "How Typical is the "Typical Urban" Channel Model?" VTC Spring 2008, IEEE Vehicular Technology Conference, May 2008, 4 pages.

Bernado, L. et al., "Delay and Doppler Spreads of Nonstationary Vehicular Channels for Safety-Relevant Scenarios," IEEE Transactions on Vehicular Technology, vol. 63, No. 1, Jan. 2014, 12 pages.

Calvetti, D. et al., "Fast Inversion of Vandermonde-Like Matrices Involving Orthogonal Polynomials," BIT Numerical Mathematics, 33 (3), Sep. 1993, 12 pages.

Giannakis, G.B. et al., "AMOUR—Generalized Multicarrier Tranceivers for Blind CDMA Regardless of Multipath," EEE Transactions on Communications, vol. 48, No. 12, Dec. 2000, 13 pages.

Giannakis, G.B. et al., "Mutually Orthogonal Tranceivers for Blind Uplink CDMA Irrespective of Multipath Channel Nulls," ICASSP, 1999, 4 pages.

Giannakis, G.B. et al., "AMOUR—Generalized Multicarrier Transceivers for Blind CDMA Regardless of Multipath," IEEE Transactions on Communications, vol. 48, No. 12, Dec. 2000, 13 pages.

Lin, Y.P. et al., "Perfect Discrete Multitone Modulation with Optimal Tranceivers," IEEE Transactions on Signal Processing, vol. 48, No. 6, Jun. 2000, 10 pages.

Mitra, S.K., "Digital Signal Processing a Computer-Based Approach," F. Edition, Ed. McGraw-Hill, 2011, 879 pages.

Missel, R. et al., "Filter Bank Multicarrier Modulation Schemes for Future Mobile Communications," IEEE Journal on Selected Areas in Communications, vol. 35, No. 8, Aug. 2017, 15 pages.

Scaglione, A. et al., "Redundant Filterbank Precoders and Equalizers Part I: Unification and Optimal Designs," EEE Transactions on Signal Processing, vol. 47, No. 7, Jul. 1999, 19 pages.

Scaglione, A. et al., "Redundant Filterbank Precoders and Equalizers Part II: Blind Channel Estimation, Synchronization, and Direct Equalization," IEEE Transactions on Signal Processing, vol. 47, No. 7, Jul. 1999, 16 pages.

Scaglione, A. et al., "Design of User Codes in QS-CDMA Systems for MUI Elimination in Unknown Multipath," IEEE Communications Letters, vol. 3, No. 2, Feb. 1999, 3 pages.

Scaglione, A. et al., "Lagrange/Vandermonde MUI Eliminating User Codes for Quasi-Synchronous CDMA in Unknown Multipath," IEEE Transactions on Signal Processing, vol. 48, No. 7, Jul. 2000, 17 pages.

Schwarz, S. et al., "Signal Processing Challenges in Cellular-Assisted Vehicular Communication, Efforts and Developments within 3GPP LTE and Beyond," IEEE Signal Processing Magazine, Mar. 2017, 13 pages.

Skrzipek, M.R., Inversion of Vandermonde-Like Matrices, BIT Numerical Mathematics, 44(2), 2004, 16 pages.

Vaidyanathan, P.P. et al., "Discrete Multitone Modulation with Principal Component Filter Banks," IEEE Transactions on Circuits and System—I: Fundamental Theory and Application, vol. 49, No. 10, Oct. 2002, 16 pages.

Zhou, S. et al., "Long Codes for Generalized FH-OFDMA Through Unknown Multipath Channels," IEEE Transactions an Communications, vol. 49, No. 4, Apr. 2001, 13 pages.

"3rd Generation Partnership Project; Technical Specification Group Radio Access Network; Study on New Radio Access Technology; RF and co-existence aspects (Release 14)," 3GPP TR 38.803 V2.0.0, RP-170439, Mar. 2017, 192 pages.

* cited by examiner

DEVICES AND METHODS FOR MULTICARRIER MODULATION SCHEMES

CROSS-REFERENCE TO RELATED APPLICATIONS

This application is a continuation of International Application No. PCT/EP2019/062620, filed on May 16, 2019, the disclosure of which is hereby incorporated by reference in its entirety.

TECHNICAL FIELD

The present disclosure relates generally to the field of multicarrier systems, and particularly to a transmitter device, a receiver device, a transceiver device and implemented methods thereof.

The present disclosure specifically presents a transceiver device, which provides a new waveform design based on a Lagrange-Vandermonde (LV) multicarrier modulation scheme or a Vandermonde-Lagrange (VL) multicarrier modulation scheme, which may allow for single-tap equalization with a low complex transceiver design. The present invention also presents a transmitter device, in particular for a multicarrier modulation scheme such as the LV or the VL multicarrier modulation scheme. The invention also presents a receiver device, in particular for a multicarrier modulation scheme such as the LV or the VL multicarrier modulation scheme.

BACKGROUND

The 3rd Generation Partnership Project (3GPP) agreed to use the Orthogonal Frequency Division Multiplexing (OFDM) (e.g., with some small modifications) for the Fifth Generation (5G) mobile communications. Although, such decision may be useful in terms of backwards compatibility to the Fourth Generation (4G) wireless systems, it is not the most efficient technique for all possible use cases. Moreover, the OFDM may be used as the modulation format (or the waveform) in both downlink (DL) and uplink (UL) transmissions. Furthermore, while the OFDM use is well-known for DL transmissions, it is new for the UL transmissions in the mobile communication networks. In addition, having the same waveform in both UL and DL transmissions may enable an easier communication for the device-to-device communication in future releases. However, the future mobile systems may be highly heterogeneous, and may also be characterized by a large range of possible use cases, for example, ranging from enhanced Mobile BroadBand (eMBB) over enhanced Machine Type Communications (eMTC) to Ultra-Reliable Low latency Communications (URLLC) in the vehicular communications. Therefore, a more flexible waveform design is of great significance to handle all the aforementioned use cases.

Two conventional OFDM-based schemes, referred to as the Cyclic Prefix (CP) OFDM scheme 1800 and the Zero-Padding (ZP) OFDM scheme 1700, are schematically illustrated in FIG. 18 and FIG. 17, respectively. The CP-OFDM scheme 1800 and ZP-OFDM scheme 1700 are known to guarantee Inter-Symbol Interference (ISI) cancellation. Moreover, assuming that K subcarriers have been used in both schemes, the frequency domain received signal (at the output of the demodulator) is given by Eq. 1:

$$y = \begin{bmatrix} H_0 & & \\ & \ddots & \\ & & H_{K-1} \end{bmatrix} s + F\tilde{n} \quad \text{Eq. 1}$$

where $$H_k = H(2\pi k/K) = \sum_{l=0}^{L} h_l e^{-j2\pi kl/K}$$

is the frequency response channel at the $k^{th}$ subcarrier, and F is a Discrete Fourier Transform (DFT) K×K matrix given by Eq. 2:

$$F = F_{K \times K} = \frac{1}{K} \begin{bmatrix} 1 & 1 & \cdots & 1 \\ 1 & w & \cdots & w^{K-1} \\ \vdots & \vdots & & \vdots \\ 1 & w^{K-1} & \cdots & w^{(K-1)(K-1)} \end{bmatrix}, w = \exp\left(-j\frac{2\pi}{K}\right) \quad \text{Eq. 2}$$

However, it has the obvious drawback that the symbol $s_k(n)$ transmitted on the $k^{th}$ subcarrier cannot be recovered when it is hit by a channel zero ($H_k=0$). In this case, the Perfect Recovery (PR) condition has not been satisfied.

Generally, a Lagrange-Vandermonde scheme has also been proposed for Code-Division Multiple Access (CDMA) systems. FIG. 19 schematically illustrates a conventional scheme based on a Mutually-Orthogonal Usercode-Receiver (AMOUR) block diagram 1900. The AMOUR system is the most generalized framework for quasi-synchronous blind CDMA which has been proposed.

In the AMOUR system 1900, following operations may be performed:

1. Every user transmitting K symbols may use K spreading codes of length P, where P=M(L+K)+L, where M is the number of users, and where L is the channel delay spread.

2. The $k^{th}$ symbol of the $\mu^{th}$ user may use the spreading code (e.g., it may be derived from Lagrange polynomials, for example, based on Eq. 3):

$$C_{\mu,k}(z) = \sum_{\lambda=0}^{J-1} \theta_\mu(\lambda, k) \sum_{\substack{m=0 \\ (m,j) \neq (\mu, \lambda)}}^{M-1} \sum_{j=0}^{J-1} \frac{1 - \rho_{m,j} z^{-1}}{1 - \rho_{m,j} \rho_{\mu,\lambda}^{-1}}. \quad \text{Eq. 3}$$

The J=K+L receive filters of the $m^{th}$ user may form a Vandermonde matrix, for example, based on Eq. 4:

$$G_m = [v_P(\rho_{m,0}) \cdots v_P(\rho_{m,J-1})]^T \quad \text{Eq. 4}$$

where $v_p(\varphi)$ may be obtained from Eq. 5:

$$v_P(\rho) = [1, \rho^{-1}, \ldots, \rho^{-(P-1)}]^T \quad \text{Eq. 5}$$

However, the conventional devices and methods have the following disadvantages.

1. The Perfect Recovery (PR) condition may not always be satisfied. Moreover, a single tap equalization cannot be used, and a more complex receiver is required. For example, if the $\Gamma_m^{(zf)} = \tilde{H}_m^{-1}$, where $\tilde{H}_m$ may be obtained according to Eq. 6:

$$\tilde{H}_m := \begin{bmatrix} h_m(i;0) & \cdots & 0 & \cdots & 0 \\ \vdots & \ddots & \vdots & & \vdots \\ h_m(i;K-1) & & h_m(i;0) & & 0 \\ \vdots & \ddots & \vdots & \ddots & \vdots \\ 0 & \cdots & h_m(i;K-1) & \cdots & h_m(i;0) \end{bmatrix} \quad \text{Eq. 6}$$

2. The transmitter (Tx) is required to communicate the signature roots ($\underline{\rho}$) to the receiver (Rx) (e.g., in order to build the G and the $V_m$). In this case, the channel state information should be available at the Tx (CSIT), in order to select the signature roots that should be communicated to the Rx.

3. Currently, there is no proposal for an optimal signature roots selection (lack of a method for modifying (e.g., adjusting, optimizing) the signature roots selection). For instance, the signature roots of all users may be selected over the unit circles, where the $k^{th}$ signature root of the $m^{th}$ user is given by $$\rho_{m,k} = e^{j\frac{2\pi(m+kM)}{M(L+K)}}, m \in [0, M-1]. \quad \text{Eq. 7}$$

4. High implementation complexity. For example, conventionally, the Rx needs to invert the $V_m$ while the inversion of a Vandermonde matrix is complex and costs $O(J^3)$ amount of operations, where J=K+L. Moreover, conventionally, signature roots are also used that are spread over the unit circle where $V_m^{-1}$ reduces to a Discrete Fourier Transform (DFT) matrix (see disadvantage mentioned under point 3).

5. Unbalanced hardware implementation. For example, the J Rx filters may be needed while only the KTx codes have been used. This redundancy is at the cost of the bandwidth efficiency.

6. The proposed scheme where the $m^{th}$ Tx uses spreading $C_{m,k}$ (given above) for the $k^{th}$ symbol cannot be used for a multicarrier system, since the expression for every user m reduces to a single carrier transmission while the signature roots spread over a unit circle (i.e., it cannot be seen as an OFDM scheme).

Although there exist techniques for providing a multicarrier modulation scheme (e.g., the conventional ZP-OFDM scheme and the conventional CP-OFDM scheme), it is generally desirable to provide improved devices and methods, e.g. for providing a multicarrier modulation scheme.

SUMMARY

In view of the above-mentioned problems and disadvantages, embodiments of the present invention aim to improve the conventional devices and methods. An objective is thereby to provide devices and methods for providing a new multicarrier modulation scheme.

The objective of the present invention is achieved by the embodiments provided in the enclosed independent claims. Advantageous implementations of the embodiments are further defined in the dependent claims.

In particular the embodiments of the invention proposes devices and methods based on two multicarrier modulation schemes referred to as Lagrange-Vandermonde modulation scheme and Vandermonde-Lagrange modulation scheme that may generalize the conventional ZP-OFDM and CP-OFDM, respectively, while satisfying the PR condition.

The main advantages of the embodiments of the invention can be summarized as follows.

Providing a Lagrange-Vandermonde or a Vandermonde-Lagrange multicarrier modulation scheme, which may satisfy the perfect recovery conditions.

Providing devices and methods for a single user transceiver.

Keeping the transceiver implementation with the least complexity and balanced implementation (for example, same as OFDM).

The present invention generalizes the OFDM-based schemes.

The performance of the present invention (devices and methods of the present invention) may outperform the OFDM performance.

A first aspect of the invention provides a transmitter device for a multicarrier modulation scheme, the transmitter device being configured to obtain a plurality of signature roots based on receiving a feedback message from a receiver device, wherein each signature root is a nonzero complex point; construct a Lagrange matrix or a Vandermonde matrix from the plurality of signature roots; and generate a multicarrier modulated signal based on the Lagrange matrix or the Vandermonde matrix.

The transmitter device of the first aspect may provide, for example, a precoder or a modulation scheme with (perfect) inter-symbol interference cancellation.

In some embodiments, the transmitter device may obtain the plurality of signature roots, for example, the transmitter device may receive a feedback message from the receiver device. The feedback message may indicate the radius of a circle that the plurality of signature roots uniformly distributed on its circumference. Moreover, the transmitter device may obtain the signature roots based on the radius of the circle.

In an implementation form of the first aspect, the feedback message indicates a radius of a circle, wherein the plurality of signature roots are uniformly distributed on the circumference of the circle.

In particular, the transmitter device may obtain a feedback message from a receiver device. The receiver device may determine (and may further provide to the transmitter device) the signature roots that are uniformly distributed on the circumference of the circle, for example, the plurality of the signature roots may spread over a circle having a radius of "a". Moreover, for K subcarriers, the signature roots may be given by $$\rho_k = ae^{\frac{j2\pi k}{K}}.$$

Moreover, every user has its own channel environment for which the signature roots may further be modified (e.g., optimized). In addition, the K signature roots of every user m may be modified (e.g., optimized) according to a certain metric.

In a further implementation form of the first aspect, the transmitter device is further configured to allocate a determined transmit power to each subcarrier of the multicarrier modulated signal according to a tuning factor estimated based on the radius of the circle.

In particular, the transmitter device may use a precoder that tunes the transmit power over the multicarrier (or transmitter device filter bank). Moreover, the tuning factor ($\kappa_k$) may depend on the radius of the circle "a", e.g., on the value of the radius according to Eq. 8:

$$\kappa_k = \kappa = K\sqrt{\frac{1-a^2}{1-a^{2K}}} \qquad \text{Eq. 8}$$

In a further implementation form of the first aspect, wherein the plurality of signature roots are obtained based on $$\rho_k = ae^{\frac{j2\pi k}{K}}$$

where $\rho_k$ corresponds to a signature root related to the $k^{th}$ subcarrier, where a corresponds to the radius of the circle, and where K is the number of the subcarriers.

In a further implementation form of the first aspect, the feedback message indicates at least one vector for the plurality of signature roots.

For example, in some embodiments, the receiver device may modify the plurality of the signature roots. Furthermore, the receiver device may send at least one vector for the plurality of signature roots which may indicate the modified signature roots. The vector may be a vector of the complex points. The transmitter device may use the vector and may construct the Vandermonde matrix or the Lagrange matrix based on the modified signature roots.

In a further implementation form of the first aspect, the transmitter device is further configured to allocate a determined transmit power to each subcarrier of a multicarrier modulated signal according to a tuning factor estimated based on the plurality of signature roots.

For example, the tuning factor may be estimated based on the plurality of signature roots ($\rho_k$) and according to Eq. 9:

$$x_k = |\kappa_k|^{-1}|C(\rho_k)|^{-1} \qquad \text{Eq. 9}$$

In a further implementation form of the first aspect, the transmitter device is further configured to perform, when constructing a Lagrange matrix, a zero-padding procedure on the multicarrier modulated signal; or perform, when constructing a Vandermonde matrix, a cyclic-prefix procedure on the multicarrier modulated signal.

A second aspect of the invention provides a receiver device for a multicarrier modulation scheme, the receiver device being configured to determine a plurality of signature roots, wherein each signature root is a nonzero complex point; construct a Lagrange matrix or a Vandermonde matrix from the plurality of signature roots; and perform a demodulation of a multicarrier modulated signal based on the Lagrange matrix or the Vandermonde matrix.

The receiver device of the second aspect may satisfy a Perfect Recovery (PR) condition. For example, in some embodiments, the transmitter device may use the precoder or the modulation scheme with perfect ISI cancellation. Moreover, a linear receiver device with single tap equalization may be provided. With the knowledge of channel sate information at this stage, a linear reduced-complexity receiver device may be provided which may satisfy the perfect recovery condition.

In an implementation form of the second aspect, the receiver device is further configured to determine a radius of a circle based on channel state information of a communication channel, wherein the determined plurality of signature roots are uniformly distributed on the circumference of the circle.

In some embodiments, for example, for K subcarriers, the receiver device may determine (choose) the signature roots that are uniformly distributed on the circumference of the circle.

In a further implementation form of the second aspect, the receiver device is further configured to send a feedback message to a transmitter device indicating the radius of the circle.

As discussed, in some embodiments, the receiver device may choose the plurality of signature roots which are uniformly distributed on the circumference of the circle. The circle may have the radius of "a". Moreover, the receiver device may send a feedback message to the transmitter device which may indicate the radius "a" of the circle.

In a further implementation form of the second aspect, the receiver device is further configured to compute a metric for evaluating the radius of the circle and/or the plurality of signature roots, based on the channel state information of the communication channel.

In some embodiments, the receiver device may further modify the radius "a" through an optimization block using a metric (such as the Mean Squared Error (MSE)) and may further obtain $a_{opt}$. The $a_{opt}$ is the radius "a" which may be modified, optimized, etc. Moreover, the receiver device may send a feedback message to the transmitter device and may provide the "$a_{opt}$" to the transmitter device.

In a further implementation form of the second aspect, the receiver device is further configured to modify individually each signature root from the plurality of signature roots based on a machine learning algorithm, in particular a gradient descent algorithm.

For example, in some embodiments, the receiver device may include a $\rho$ refinement algorithm or a $\rho$ refinement unit which may be configured to modify (e.g., refine, optimize) the plurality of signature roots. In particular, the $\rho$ refinement algorithm may be based on the machine learning algorithm such as the gradient descent algorithm.

In a further implementation form of the second aspect, the receiver device is further configured to determine at least one vector for the plurality of signature roots, based on the individual modification of each signature root; and send a feedback message to the transmitter device indicating the at least one vector for the plurality of signature roots.

For example, in some embodiments, at least one signature root may be modified. Moreover, the receiver device may determine at least one vector for the modified signature root and may further provide the vector to the transmitter device.

In some embodiments, the receiver may uses $a_{opt}$ or the refined signature points to construct the receive filters (e.g., the Vandermonde matrix) and it may further feedback the $a_{opt}$ or the refined signature points to the transmitter device in order to construct the transmit filters (e.g., the Vandermonde matrix)

In a further implementation form of the second aspect, the receiver device is further configured to perform a one-tap equalization on the demodulated signal, based on the plurality of signature roots.

A third aspect of the invention provides a transceiver device comprising a transmitter according to the first aspect or one of the implementation form of the first aspect and a receiver device according to second aspect or one of the implementation form of the second aspect.

The transceiver device of the third aspect may comprise the transmitter device (according to the first aspect or one of the implementation form of the first aspect) which may provide the precoder or the modulation scheme with perfect ISI cancellation. Moreover, the transceiver device of the third aspect may further comprise the receiver device (according to second aspect or one of the implementation form of the second aspect) which may be based on a linear reduced-complexity receivers with single tap equalization that satisfies the perfect recovery condition.

A fourth aspect of the invention provides a transceiver device for a multicarrier modulation scheme, the transceiver device comprising a transmitter device configured to generate a multicarrier modulated signal based on constructing a Lagrange matrix or a Vandermonde matrix; and a receiver device configured to perform a demodulation of the multicarrier modulated signal based on constructing the other matrix from the Lagrange matrix or the Vandermonde matrix constructed by the transmitter device.

In particular, the transceiver device of the fourth aspect may be based on (e.g., it may provide) the two multicarrier modulation schemes referred to as Lagrange-Vandermonde modulation scheme and Vandermonde-Lagrange modulation scheme that may generalize the conventional ZP-OFDM and CP-OFDM, respectively.

A fifth aspect of the invention provides a method for being implemented at a transmitter device, the method comprising obtaining a plurality of signature roots based on receiving a feedback message from a receiver device, wherein each signature root is a nonzero complex point; constructing a Lagrange matrix or a Vandermonde matrix from the plurality of signature roots; and generating a multicarrier modulated signal based on the Lagrange matrix or the Vandermonde matrix.

In an implementation form of the fifth aspect, the feedback message indicates a radius of a circle, wherein the plurality of signature roots are uniformly distributed on the circumference of the circle.

In a further implementation form of the fifth aspect, the method further comprises allocating a determined transmit power to each subcarrier of the multicarrier modulated signal according to a tuning factor estimated based on the radius of the circle.

In a further implementation form of the fifth aspect, the plurality of signature roots are obtained based on $$\rho_k = ae^{\frac{j2\pi k}{K}}$$

Where $\rho_k$ corresponds to a signature root related to the $k^{th}$ subcarrier, where a corresponds to the radius of the circle, and where K is the number of the subcarriers.

In a further implementation form of the fifth aspect, the feedback message indicates at least one vector for the plurality of signature roots.

In a further implementation form of the fifth aspect, the method further comprises allocating a determined transmit power to each subcarrier of a multicarrier modulated signal according to a tuning factor estimated based on the plurality of signature roots.

In a further implementation form of the fifth aspect, the method further comprises performing, when constructing a Lagrange matrix, a zero-padding procedure on the multicarrier modulated signal; or performing, when constructing a Vandermonde matrix, a cyclic-prefix procedure on the multicarrier modulated signal.

A sixth aspect of the invention provides a method for being implemented at a receiver device, the method comprising determining a plurality of signature roots, wherein each signature root is a nonzero complex point; constructing a Lagrange matrix or a Vandermonde matrix from the plurality of signature roots; and performing a demodulation of a multicarrier modulated signal based on the Lagrange matrix or the Vandermonde matrix.

In an implementation form of the sixth aspect, the method further comprises determining a radius of a circle based on channel state information of a communication channel, wherein the determined plurality of signature roots are uniformly distributed on the circumference of the circle.

In a further implementation form of the sixth aspect, the method further comprises sending a feedback message to a transmitter device indicating the radius of the circle.

In a further implementation form of the sixth aspect, the method further comprises computing a metric for evaluating the radius of the circle and/or the plurality of signature roots, based on the channel state information of the communication channel.

In a further implementation form of the sixth aspect, the method further comprises modifying individually each signature root from the plurality of signature roots based on a machine learning algorithm, in particular a gradient descent algorithm.

In a further implementation form of the sixth aspect, the method further comprises determining at least one vector for the plurality of signature roots, based on the individual modification of each signature root; and sending a feedback message to the transmitter device indicating the at least one vector for the plurality of signature roots.

In a further implementation form of the sixth aspect, the method further comprises performing a one-tap equalization on the demodulated signal, based on the plurality of signature roots.

A seventh aspect of the invention provides a method for being implemented at a transceiver device, the method comprising generating, at a transmitter device, a multicarrier modulated signal based on constructing a Lagrange matrix or a Vandermonde matrix; and performing, at a receiver device, a demodulation of the multicarrier modulated signal based on constructing the other matrix from the Lagrange matrix or the Vandermonde matrix constructed by the transmitter device.

In an implementation form of the seventh aspect, the method further comprises allocating, at the transmitter device, a determined transmit power to each subcarrier of the multicarrier modulated signal according to a tuning factor estimated based on the radius of the circle.

In a further implementation form of the seventh aspect, the method further comprises determining the plurality of signature roots ($\rho_k$) based on $$\rho_k = ae^{\frac{j2\pi k}{K}}$$

where $\rho_k$ corresponds to a signature root related to the $k^{th}$ subcarrier, where a corresponds to the radius of the circle, and where K is the number of the subcarriers.

In a further implementation form of the seventh aspect, the method further comprises sending a feedback message from the receiver device to the transmitter device, wherein the feedback message indicates at least one vector for the plurality of signature roots ($\rho_k$).

In a further implementation form of the seventh aspect, the method further comprises allocating at the transmitter device, a determined transmit power to each subcarrier of a multicarrier modulated signal according to a tuning factor estimated based on the plurality of signature roots ($\rho_k$).

In a further implementation form of the seventh aspect, the method further comprises performing, at the transmitter device, when constructing a Lagrange matrix, a zero-padding procedure on the multicarrier modulated signal; or performing, at the transmitter device, when constructing a Vandermonde matrix, a cyclic-prefix procedure on the multicarrier modulated signal.

In a further implementation form of the seventh aspect, the method further comprises determining, at the receiver device, a radius of a circle based on channel state information of a communication channel, wherein the determined plurality of signature roots ($\rho_k$) are uniformly distributed on the circumference of the circle.

In a further implementation form of the seventh aspect, the method further comprises computing a metric for evaluating the radius of the circle and/or the plurality of signature roots ($\rho_k$), based on the channel state information of the communication channel.

In a further implementation form of the seventh aspect, the method further comprises modifying individually each signature root from the plurality of signature roots ($\rho_k$) based on a machine learning algorithm, in particular a gradient descent algorithm.

In a further implementation form of the seventh aspect, the method further comprises determining, at the receiver device, at least one vector for the plurality of signature roots ($\rho_k$), based on the individual modification of each signature root; and sending a feedback message to the transmitter device indicating the at least one vector for the plurality of signature roots ($\rho_k$).

In a further implementation form of the seventh aspect, the method further comprises performing, at the receiver device, a one-tap equalization on the demodulated signal, based on the plurality of signature roots ($\rho_k$).

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which.

DETAILED DESCRIPTION OF ILLUSTRATIVE EMBODIMENTS

Figure 1:
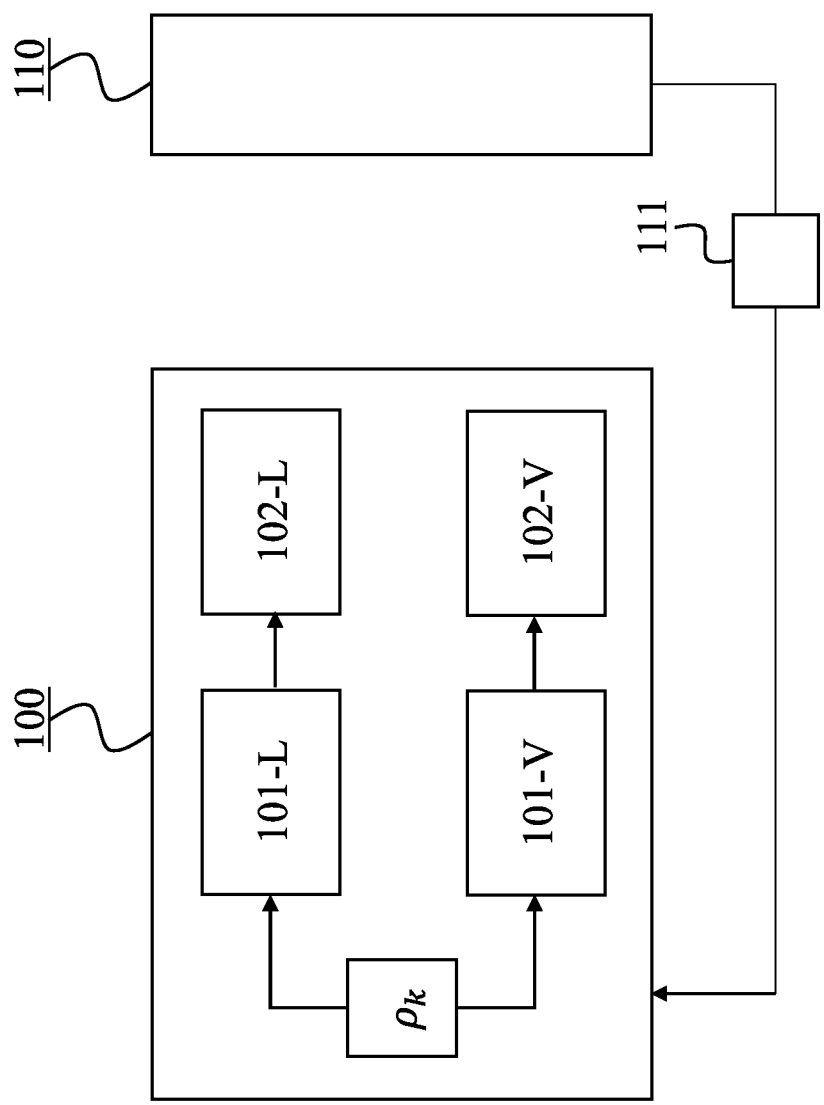
FIG. 1 is a schematic view of a transmitter device for a multicarrier modulation scheme, according to an embodiment of the present invention.

FIG. 1 is a schematic view of a transmitter device 100 for a multicarrier modulation scheme, according to an embodiment of the present invention.

The transmitter device 100 for the multicarrier modulation scheme is configured to obtain a plurality of signature roots $\rho_k$ based on receiving a feedback message 11 from a receiver device 110, wherein each signature root is a nonzero complex point.

The transmitter device 100 is further configured to construct a Lagrange matrix 101-L or a Vandermonde matrix 101-V from the plurality of signature roots $\rho_k$.

The transmitter device 100 is further configured to generate a multicarrier modulated signal 102-L, 102-V based on the Lagrange matrix 101-L or the Vandermonde matrix 101-V.

The transmitter device 100 may comprise processing circuitry (not shown) configured to perform, conduct or initiate the various operations of the transmitter device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the transmitter device 100 to perform, conduct or initiate the operations or methods described herein.

Moreover, in some embodiments, the transmitter device 100 may further be incorporated in a transceiver device.

Figure 2:
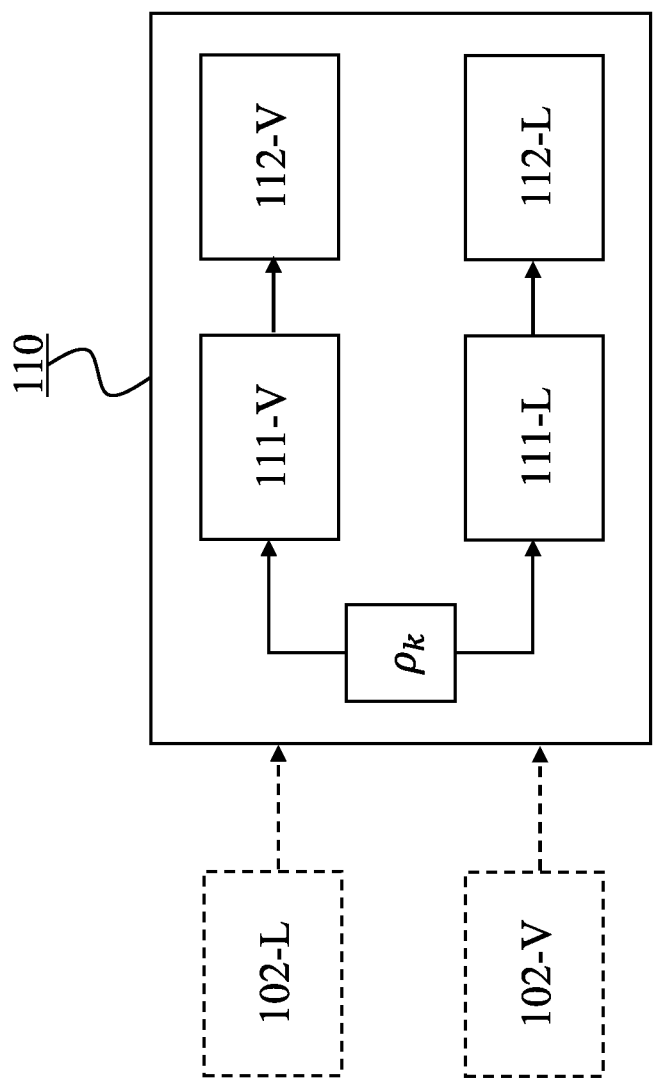
FIG. 2 is a schematic view of a receiver device for a multicarrier modulation scheme, according to an embodiment of the present invention.

FIG. 2 is a schematic view of a receiver device 110 for a multicarrier modulation scheme, according to an embodiment of the present invention.

The receiver device 110 for the multicarrier modulation scheme is configured to determine a plurality of signature roots $\rho_k$, wherein each signature root is a nonzero complex point.

The receiver device 110 is further configured to construct a Lagrange matrix 111-L or a Vandermonde matrix 111-V from the plurality of signature roots $\rho_k$ The receiver device 110 is further configured to perform a demodulation 112-V, 112-L of a multicarrier modulated signal 102-L, 102-V based on the Lagrange matrix 111-L or the Vandermonde matrix ill-V.

The receiver device 110 may comprise processing circuitry (not shown) configured to perform, conduct or initiate the various operations of the receiver device 110 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the receiver device 110 to perform, conduct or initiate the operations or methods described herein.

Moreover, in some embodiments, the receiver device 110 may further be incorporated in a transceiver device.

Figure 3:
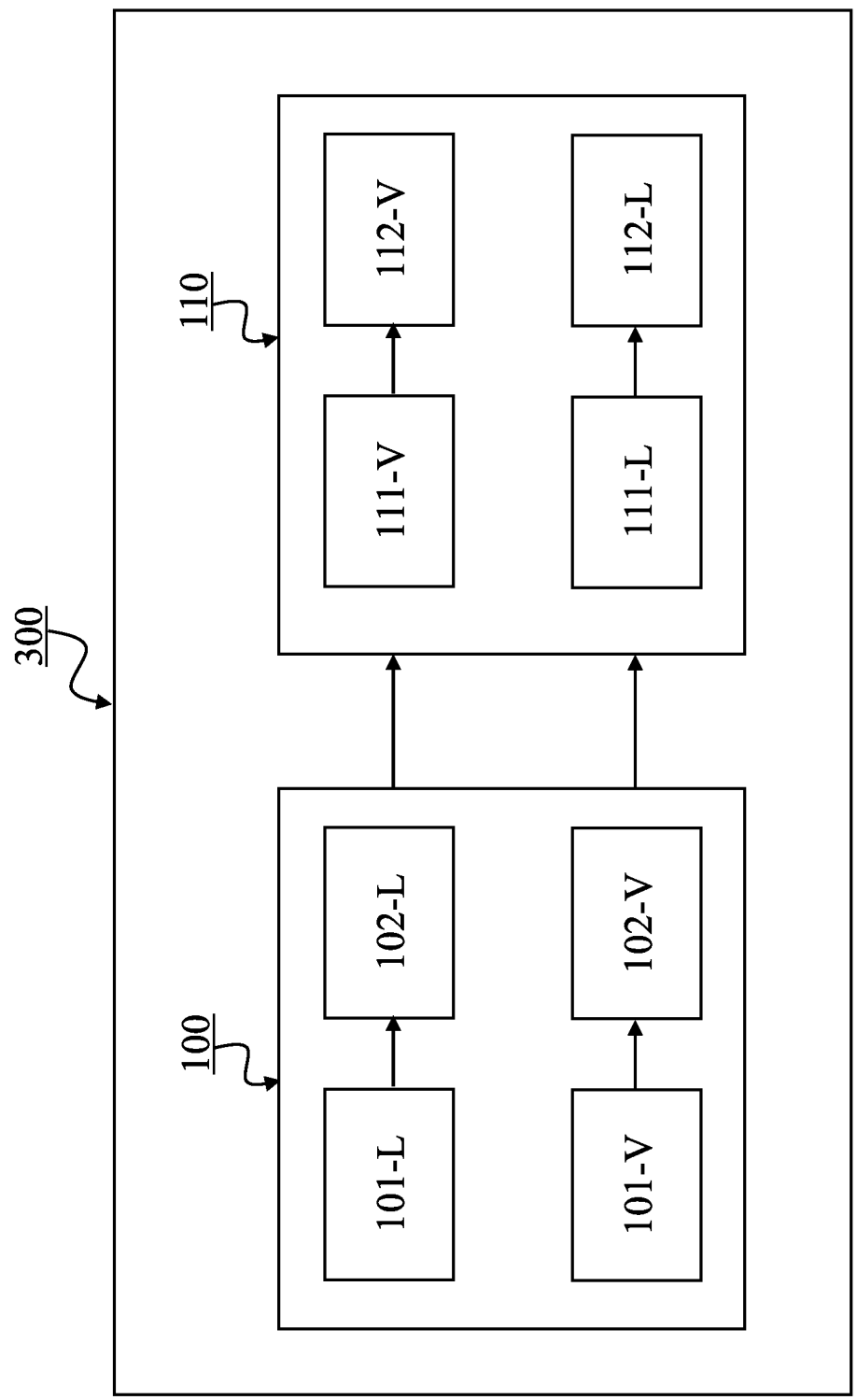
FIG. 3 is a schematic view of a transceiver device for a multicarrier modulation scheme, according to an embodiment of the present invention.

FIG. 3 is a schematic view of a transceiver device 300 for a multicarrier modulation scheme, according to an embodiment of the present invention.

The transceiver device 300 comprises a transmitter device 100 configured to generate a multicarrier modulated signal 102-L, 102-V based on constructing a Lagrange matrix 101-L or a Vandermonde matrix 101-V.

The transceiver device 300 further comprises a receiver device 110 configured to perform a demodulation 112-V, 112-L of the multicarrier modulated signal 102-L, 102-V based on constructing the other matrix 111-V, 111-L from the Lagrange matrix or the Vandermonde matrix constructed by the transmitter device 100.

For example, the transceiver device 300 may be based on a LV multicarrier modulation scheme. For instance, the transmitter device 100 of the transceiver device 300 may generate the multicarrier modulated signal 102-L based on constructing a Lagrange matrix 101-L. Moreover, the receiver device 110 may obtain the multicarrier modulated signal 102-L and may further construct the Vandermonde matrix 111-V from the plurality of signature roots $\rho_k$. Furthermore, the receiver device 110 may perform the demodulation 112-V of the multicarrier modulated signal 102-L based on the Vandermonde matrix ill-V.

Similarly, the transceiver device 300 may be based on a VL multicarrier modulation scheme. For instance, the transmitter device 100 of the transceiver device 300 may generate the multicarrier modulated signal 102-V based on constructing a Vandermonde matrix 101-V. Moreover, the receiver device 110 may obtain the multicarrier modulated signal 102-V and may further construct the Lagrange matrix 111-L from the plurality of signature roots ρ_k. Furthermore, the receiver device 110 may perform the demodulation 112-L of the multicarrier modulated signal 102-V based on the Lagrange matrix 111-L.

The transceiver device 300 may comprise processing circuitry (not shown) configured to perform, conduct or initiate the various operations of the transceiver device 300 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the transceiver device 300 to perform, conduct or initiate the operations or methods described herein.

In the following, some mathematical basics and notation are briefly discussed, that may be used by the transmitter device 100 and/or the receiver device 110 and/or the transceiver device 300, without limiting the present invention.

For example, from a set of K distinct nonzero complex points $\{\rho_k\}_{k=1}^{K}$, that are referred to as signature roots, a Vandermonde matrix may be constructed. The Vandermonde matrix, is a K×P matrix, given by Eq. 10:

$$V_{K \times P} = \begin{bmatrix} 1 & \rho_0^{-1} & \cdots & \rho_0^{1-P} \\ 1 & \rho_1^{-1} & \cdots & \rho_1^{1-P} \\ \vdots & \vdots & & \vdots \\ 1 & \rho_{K-1}^{-1} & \cdots & \rho_{K-1}^{1-P} \end{bmatrix}, v_{k,p} = \left(\rho_{k-1}^{1-p}\right) \quad \text{Eq. 10}$$

Moreover, note that, if $$\rho_k = \frac{1}{\sqrt{K}} \exp\left(j\frac{2\pi k}{K}\right) = \frac{1}{\sqrt{K}} w^{-k},$$

therefore, $V_{K \times K} = F_{K \times K}$ which is the Discerete Fouriuer Transofrm (DFT) matrix given above.

Furthermore, the Lagrange basis polynomials (e.g., a K polynomials) may be obtained according to Eq. 11

$$F_k(z) = \kappa_k \prod_{\substack{n=0 \\ n \neq k}}^{K-1} \frac{1 - \rho_n z^{-1}}{1 - \rho_n \rho_k^{-1}} = \sum_{i=0}^{K-1} r_{k,i} z^{-i} = \begin{bmatrix} 1 & z^{-1} & \ldots & z^{1-K} \end{bmatrix} r_k \quad \text{Eq. 11}$$

where, $\kappa_k$ is a tuning factor that normalizes the transmitter device filter ($F_k$) energy. Moreover, a Lagrange matrix may be constructed, given by Eq. 12:

$$R = \begin{bmatrix} r_0 & r_1 & \ldots & r_{K-1} \end{bmatrix} = \begin{bmatrix} r_{0,0} & r_{1,0} & \ldots & r_{K-1,0} \\ r_{0,1} & r_{1,1} & \ldots & r_{K-1,1} \\ \vdots & \vdots & \vdots & \vdots \\ r_{0,K-1} & r_{1,K-1} & \ldots & r_{K-1,K-1} \end{bmatrix} \quad \text{Eq. 12}$$

Note that, $F_k(\rho_l) = \kappa_k \delta(k-l)$ where $k, l \in [0, K-1]$. Furthermore, the following identity may be verified:

$$V_{K \times K} R = \begin{bmatrix} \kappa_0 & & \\ & \ddots & \\ & & \kappa_{K-1} \end{bmatrix} \quad \text{Eq. 13}$$

where $\kappa_k$ are the tuning factors defined above.

Figure 4:
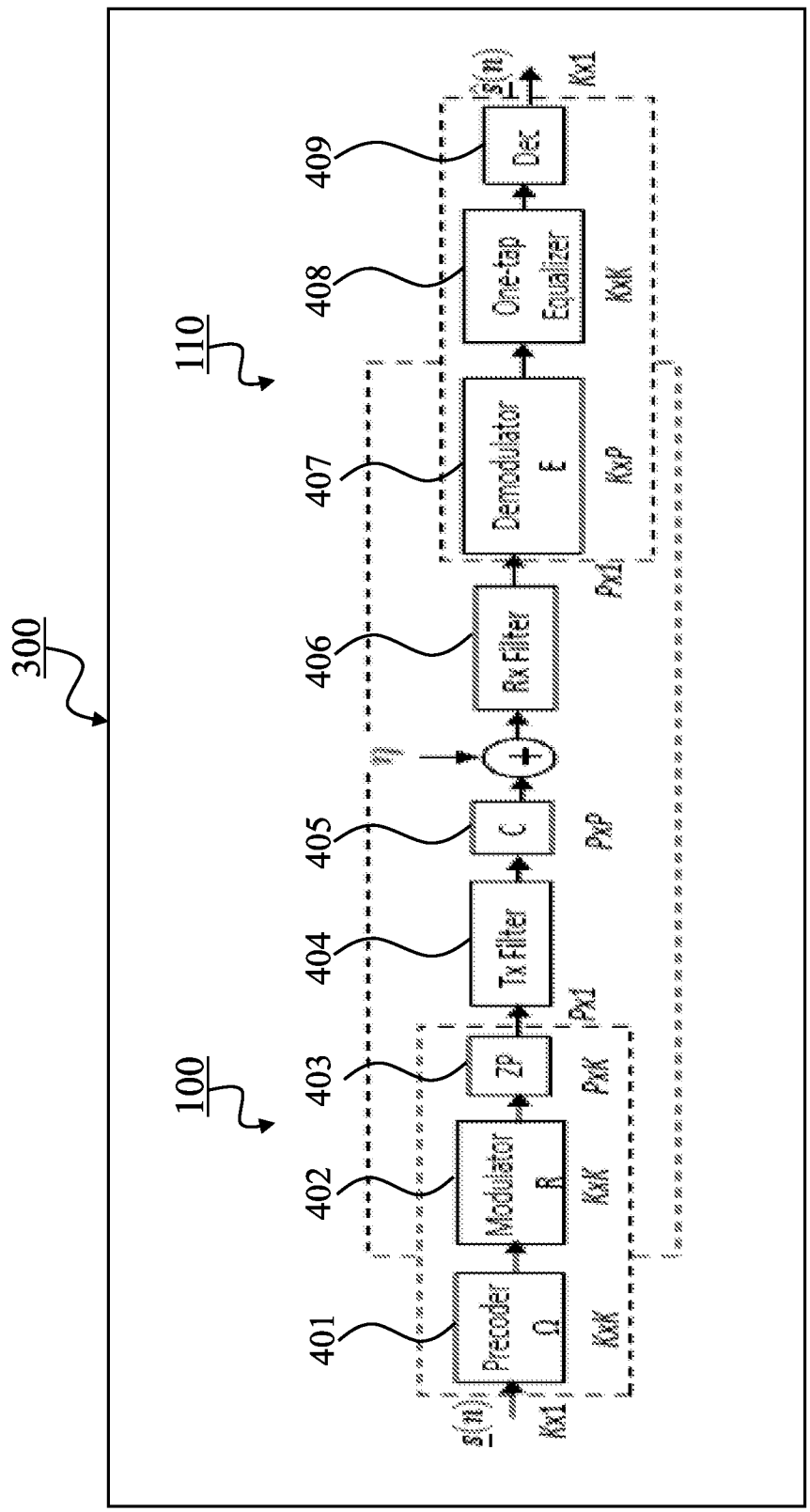
FIG. 4 is an exemplarily scheme of a transceiver device comprising a transmitter device using a Lagrange matrix for modulation and a receiver device using a Vandermonde matrix for demodulation, according to an embodiment of the invention.

Reference is made to FIG. 4 which is an exemplarily scheme of the transceiver device 300 comprising the transmitter device 100 using a Lagrange matrix for modulation and the receiver device 200 using a Vandermonde matrix for demodulation, according to an embodiment of the invention.

In the block diagram of the LV modulator of FIG. 4, the transceiver device 300 (i.e., being based on a LV modulator) is exemplarily shown for K signature roots. The transceiver device 300 comprises the transmitter device 100 which includes a precoder 401, a modulator 402 and a ZP block 403.

The precoder 401 may apply the tuning factors $\kappa_k$, for example, for allocating the determined transmit power, which may be K×K diagonal matrix (n) in FIG. 4.

Moreover, the modulator 402 uses the Lagrange matrix (R in FIG. 4) which has a size of K×K (for example, it may construct a Lagrange matrix 101-L and may further generate a multicarrier modulated signal 102-L based on the Lagrange matrix 101-L).

Furthermore, the ZP block 403 may be used for the zero-padding procedure, where every input block of K symbols will be trailed by L zeros. Therefore, it may provide and may further output block symbols with the length of P, where P=K+L.

Moreover, the communication channel of the transceiver device 300 comprises the transmitter filter (Tx filter) 404 and the receiver filter (Rx filter) 406 (for example, they may be raised cosine filters). In addition, the parameter C 405 which is a propagation channel of order L may be obtained according to Eq. 14:

$$C(z) = \sum_{l=0}^{L} h_l z^{-l} \quad \text{Eq. 14}$$

Furthermore, the convolution of the Tx filter 404, the C 405 and the Rx filter may be given by a channel matrix H.

The transceiver device 300 further comprises the receiver device (Rx) 110 which includes the demodulator 407, the one-tap Equalizer unit 408 and the decision block 409.

The demodulator 407, perform a demodulation based on constructing a matrix E which is a Vandermonde matrix having a size of K×P. The one-tap equalizer 408 uses a K×K diagonal matrix (for example, it may construct a Vandermonde matrix 111-V and may further perform a demodulation 112-V of a multicarrier modulated signal 102-L based on the Vandermonde matrix 111-V).

Furthermore, a convolution of the modulation, channel, and demodulation, is given by Eq. 15:

$$\underbrace{\begin{bmatrix} 1 & \rho_0^{-1} & \ldots & \rho_0^{1-P} \\ 1 & \rho_1^{-1} & \ldots & \rho_1^{1-P} \\ \vdots & \vdots & & \vdots \\ 1 & \rho_{K-1}^{-1} & \ldots & \rho_{K-1}^{1-P} \end{bmatrix}}_{E = V_{K \times P}} \underbrace{\begin{bmatrix} h_0 & \ldots & 0 \\ \vdots & \ddots & \vdots \\ h_L & \ddots & 0 \\ 0 & \ddots & \vdots \\ \vdots & \ddots & h_0 \\ \vdots & \ddots & \vdots \\ 0 & \ldots & h_L \end{bmatrix}}_{H : P \times K} R = \quad \text{Eq. 15}$$

$$\begin{bmatrix} \kappa_0 C(\rho_0) & & \\ & \ddots & \\ & & \kappa_{K-1} C(\rho_{K-1}) \end{bmatrix}$$

Note that, the following operations or conditions may be performed or satisfied.

This result is true $\forall \rho_k \Rightarrow$ For example, the plurality of signature roots $\rho_k$ may further be determined (e.g., an operation to obtain or determine or choose the plurality of signature roots $\rho_k$).

If $C(\rho_k) \neq 0$, $\forall k \Rightarrow$ a perfect recovery condition may be satisfied.

It may be determined, e.g., how to choose the tuning factor (it may be depend on the signature roots) in order to satisfy the transmit power constraint, normalization of the modulator: Trace($R^H R$)=K.

Overall, it may further be determined, how to choose e.g., modify, optimize) the plurality of signature roots in order to boost the system performance (such as minimize the bit error rate (BER)).

The proposed multicarrier modulation scheme (e.g., the Lagrange-Vandermonde multicarrier modulation scheme presented in FIG. 4) may generalize the conventional ZP-OFDM modulation, and may further satisfy the PR condition. At next, an exemplarily procedure is provided which discusses that this generalization may be achieved while satisfying the transmit power constraint.

As discussed above, in some embodiments, the plurality of signature roots may be modified (e.g., they may migrate, refined, optimized, or the like). However, if the transceiver device send using K signature roots, the optimization should be carried out over $\mathbb{C}^K$ where the complexity increases with the K.

This problem may be solved based on operations performed in the following two steps including step 1 and step 2.

Step I: choosing the plurality of signature roots.

For example, the plurality of signature roots ($\rho_k$) may be uniformly distributed on the circumference of the circle, e.g., uniformly spread over a circle of radius a, such that $$\rho_k = a e^{\frac{j 2 \pi k}{K}}.$$

In the embodiment of FIG. 4 in which the transceiver device is based on an LV Modulator, all of the Tx Filters ($F_k$) may have the same energy and may be normalized by $$\kappa_k = \kappa = K\sqrt{\frac{1-a^2}{1-a^{2K}}}, \forall k$$

and Eq. 16 may further be obtained:

$$F_k(z) = \kappa \prod_{\substack{n=0 \\ n \neq k}}^{K-1} \frac{1-\rho_n z^{-1}}{1-\rho_n \rho_k^{-1}} = \sum_{i=0}^{K-1} r_{k,i} z^{-i} = \frac{\kappa}{K}\sum_{q=0}^{K-1} \rho_k^q z^{-q} \quad \text{Eq. 16}$$

Furthermore, The Lagrange matrix R reduces to a Vandermonde, given by Eq. 17:

$$R = \frac{\kappa}{K}\begin{bmatrix} 1 & \rho_0 & \cdots & \rho_0^{K-1} \\ 1 & \rho_1 & \cdots & \rho_1^{K-1} \\ \vdots & \vdots & & \vdots \\ 1 & \rho_{K-1} & \cdots & \rho_{K-1}^{K-1} \end{bmatrix}^T, \quad \text{Eq. 17}$$

$$EHR = \kappa \underbrace{\begin{bmatrix} C(\rho_0) & & \\ & \ddots & \\ & & C(\rho_{K-1}) \end{bmatrix}}_{D}$$

Figure 19:
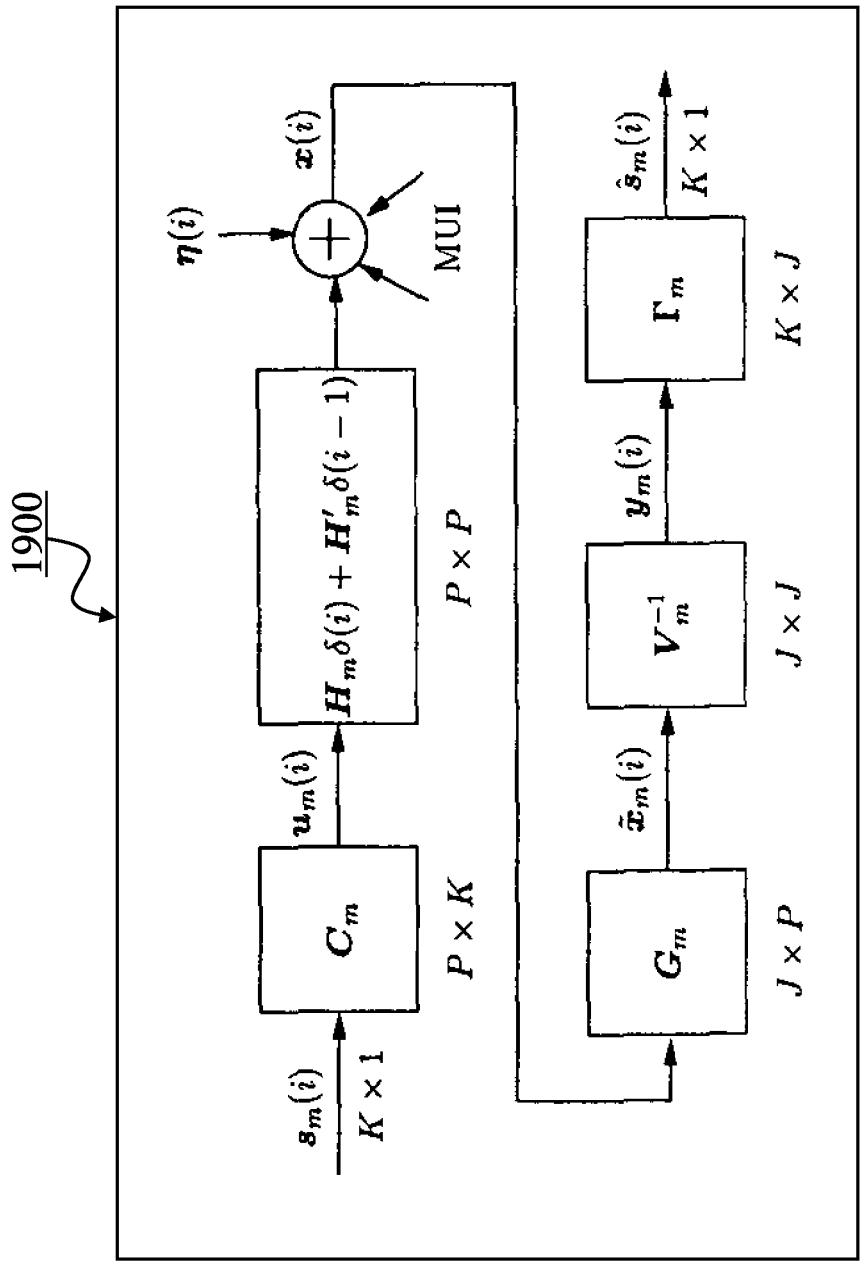
FIG. 19 schematically illustrates a conventional Mutually-Orthogonal Usercode-Receiver (AMOUR) block diagram.

Note that, when R reduces to a Vandermonde matrix, a low-complex transceiver may be implemented (for example, based on a simple one-tap equalization and no matrix inversion is required as the AMOUR system 1900 in FIG. 19).

Moreover, if a=1, therefore, the following operation is satisfied:

$$\frac{\kappa}{K} = \frac{1}{\sqrt{K}}, R = F^H \text{ and } E_{K \times P} = \overset{\square}{F} = [F\,F(:,1:L)] \quad \text{Eq. 18}$$

From the above operations (e.g., the Eq. 18) it may be determined that the LV modulator (i.e., the Lagnrange-Vandemonde multicarrier modulation scheme of the invention) generalizes the conventional ZP-OFDM multicarrier modulation scheme.

Furthermore, if a=1 is considered, therefore, D may be the Channel frequency response while satisfying the PR condition.

Moreover, a procedure for modifying the radius of the circle may be provided. For example, the transceiver device 300 (e.g., its receiver device 100) may modify (e.g., optimize) the radius of the circle, for example, determine the optimal radius as $a_{opt}$ Without loss of generalities, it may be derived that both LV and VL modulators end up with the same optimization metric's expression. In the following, the LV modulator scheme is discussed, while VL modulator may be deduced accordingly.

Referring to FIG. 4, the received signal (at the input of the demodulator E) may be given by:

$$y = \frac{1}{K}\underbrace{\begin{bmatrix} h_0 & \cdots & 0 \\ \vdots & \ddots & \vdots \\ h_L & \ddots & 0 \\ 0 & \ddots & \vdots \\ \vdots & \ddots & h_0 \\ \vdots & \ddots & \vdots \\ 0 & \cdots & h_L \end{bmatrix}}_{H} \begin{bmatrix} 1 & \rho_0 & \cdots & \rho_0^{K-1} \\ 1 & \rho_1 & \cdots & \rho_1^{K-1} \\ \vdots & \vdots & & \vdots \\ 1 & \rho_{K-1} & \cdots & \rho_{K-1}^{K-1} \end{bmatrix}^T \Omega s + \eta, \text{ where } \Omega = \quad \text{Eq. 19}$$

$$\begin{bmatrix} \kappa_0 & & \\ & \ddots & \\ & & \kappa_{K-1} \end{bmatrix}$$

Therefore, the demodulated signal is given by:

$$\hat{y} = \underbrace{\begin{bmatrix} 1 & \rho_0^{-1} & \cdots & \rho_0^{1-P} \\ 1 & \rho_1^{-1} & \cdots & \rho_1^{1-P} \\ \vdots & \vdots & & \vdots \\ 1 & \rho_{K-1}^{-1} & \cdots & \rho_{K-1}^{1-P} \end{bmatrix}}_{E} y = \underbrace{\begin{bmatrix} \kappa_0 C(\rho_0) & & \\ & \ddots & \\ & & \kappa_{K-1} C(\rho_{K-1}) \end{bmatrix}}_{D} s + \begin{bmatrix} 1 & \rho_0^{-1} & \cdots & \rho_0^{1-P} \\ 1 & \rho_1^{-1} & \cdots & \rho_1^{1-P} \\ \vdots & \vdots & & \vdots \\ 1 & \rho_{K-1}^{-1} & \cdots & \rho_{K-1}^{1-P} \end{bmatrix} \eta \quad \text{Eq. 20}$$

Moreover, the one tap-equalization is given by:

$$D^{-1}\hat{y} = s + \underbrace{\begin{bmatrix} \kappa_0^{-1} C(\rho_0)^{-1} & & \\ & \ddots & \\ & & \kappa_{K-1}^{-1} C(\rho_{K-1})^{-1} \end{bmatrix} E\eta}_{u} \quad \text{Eq. 21}$$

here, it may be determined that, a perfect recovery of s is satisfied.

In addition, a method, among other, for optimizing the radius "a" is to minimize the mean squared error (MSE) given by Eq. 22 as follow:

$$\text{MSE} = K^{-1} E[\text{Trace}(uu^H)] \quad \text{Eq. 22}$$

Moreover, in some embodiments, a uniform power allocation over subcarriers (defined by signature roots) may be used, and by using the same tuning factor $$\kappa_k = \kappa = K\sqrt{\frac{1-a^2}{1-a^{2K}}},$$

the MSE expression is given by the MSE=$K^{-1}E\{u^H U\}$ and according Eq. 23:

$$MSE = \frac{\sigma_\eta^2(1-a^{2K})(1-a^{-2(K+L)})}{\sigma_s^2 K^3(1-a^2)(1-a^{-2})}\sum_{k=0}^{K-1}|C(\rho_k)|^{-2} \quad \text{Eq. 23}$$

Therefore, the $a_{opt}$ may be determined as $$a_{opt} = \arg\min_{a} MSE.$$

Additionally, in some embodiments, the power allocation may be optimized, for example, by using different $\kappa_k$ that minimize the MSE given by Eq. 24 as follow:

$$MSE = \frac{\sigma_\eta^2(1-a^{-2(K+L)})}{\sigma_s^2(1-a^{-2})K} \sum_{k=0}^{K-1} |\kappa_k|^{-2} |C(\rho_k)|^{-2}. \quad \text{Eq. 24}$$

The $x_k = |\kappa_k|^{-1} |C(\rho_k)|^{-1}$ may be set, and the problem formulation may be according to Eq. 25 as follow:

$$\underset{x}{\text{minimize}} \sum_{k=0}^{K-1} x_k^2 \quad \text{Eq. 25}$$

$$\text{subject to} \sum_{k=0}^{K-1} \frac{E_0}{|C(\rho_k)|^2 x_k^2} = K.$$

Furthermore, the optimal $\kappa_k$ and the $MSE_{min}$ may be given by Eq. 26 and Eq. 27 as:

$$\kappa_k = \sqrt{K\left(E_0 |C(\rho_k)| \sum_{i=0}^{K-1} |C(\rho_i)|^{-1}\right)^{-1}}, \quad \text{Eq. 26}$$

and $$MSE_{min} = \frac{\sigma_\eta^2(1-a^{-2(K+L)})(1-a^{2K})}{K^4 \sigma_s^2(1-a^{-2})(1-a^2)} \left(\sum_{k=0}^{K-1} |C(\rho_k)|^{-1}\right)^2 \quad \text{Eq. 27}$$

Consequently, the $a_{opt}$ may be determined as $$a_{opt} = \arg\min_{a} MSE.$$

Step 2: modifying the plurality of the signature roots

For example, the signature roots that uniformly spread over a circle of radius $a_{opt}$ may be used, and an algorithm may further be applied that may optimize the signature roots individually following a specific optimization metric. In particular, a machine learning techniques may be used in this step.

In the following this step is exemplarily referred to as the "signature roots refinement". A detailed description of this step is provided, for example, in FIG. 7 and FIG. 12.

Figure 5:
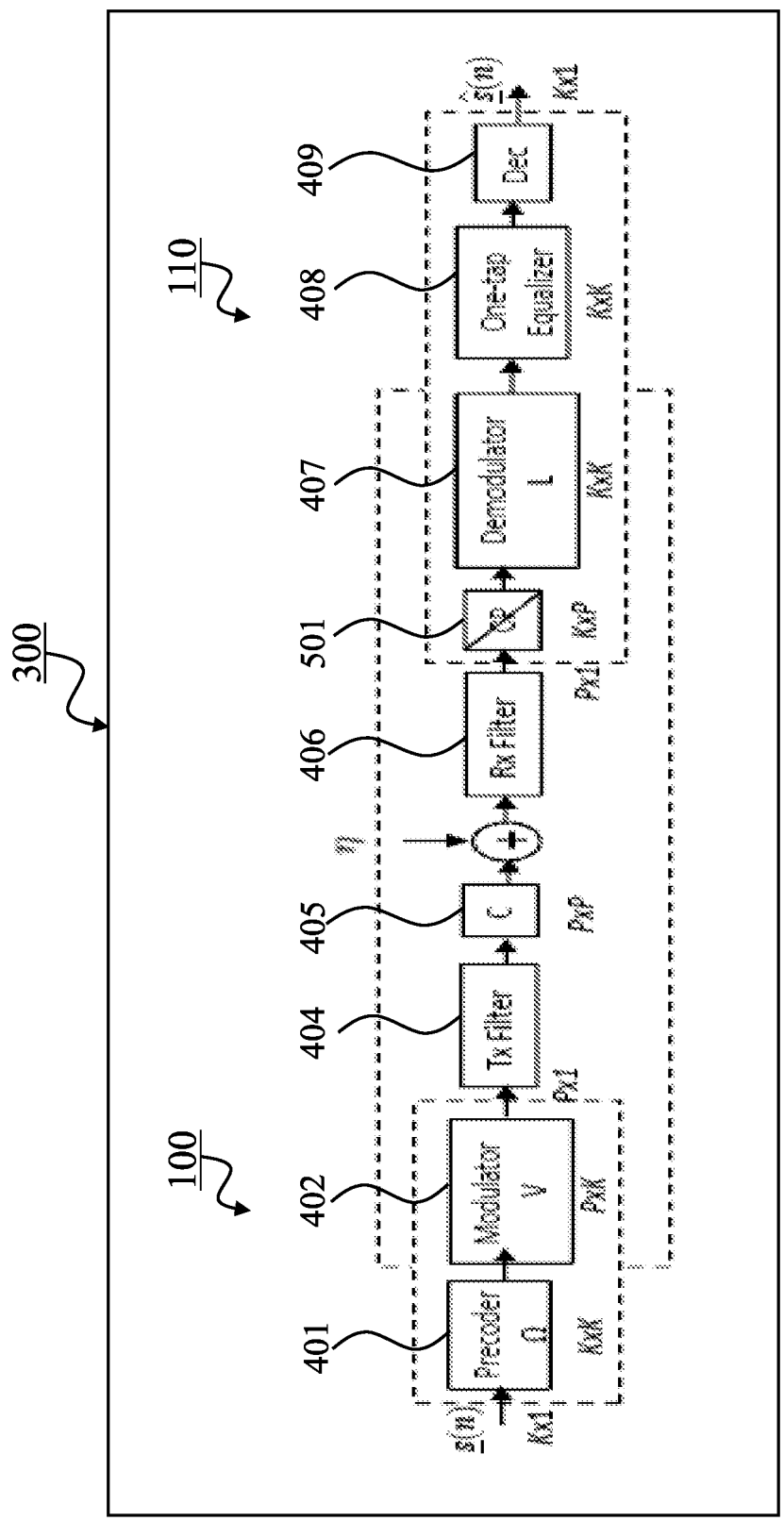
FIG. 5 is an exemplarily scheme of a transceiver device comprising a transmitter device using a Vandermonde matrix for modulation and a receiver device using a Lagrange matrix for demodulation, according to an embodiment of the invention.

Reference is made to FIG. 5 which is an exemplarily scheme of the transceiver device 300 comprising the transmitter device 100 using a Vandermonde matrix for modulation and the receiver device 110 using a Lagrange matrix for demodulation, according to an embodiment of the invention.

In the block diagram of the VL modulator of FIG. 5, the transceiver device 300 (i.e., being based on a VL modulator) is exemplarily shown for K signature roots. The transceiver device 300 comprises the transmitter device 100 which includes a precoder 401 and a modulator 402.

The precoder 401 of the transmitter device 100 may apply the tuning factors $\kappa_k$, for example, for allocating the determined transmit power, which may be K×K diagonal matrix ($\Omega$).

Moreover, the modulator 402 of the transmitter device 100 uses the Vandermonde matrix V (in FIG. 5) of size P×K, where P=K+L. For example, it may construct a Vandermonde matrix 101-V and may further generate a multicarrier modulated signal 102-V based on the Vandermonde matrix 101-V.

Moreover, the communication channel of the transceiver device 300 comprises the transmitter filter (Tx filter) 404 and the receiver filter (Rx filter) 406 (for example, they may be raised cosine filters). In addition, the parameter C 405 which is a propagation channel of order L may be obtained according to Eq. 28:

$$C(z) = \sum_{l=0}^{L} h_l z^{-l} \quad \text{Eq. 28}$$

Furthermore, the convolution of the Tx filter 404, the C 405 and the Rx filter may be given by a channel matrix H.

The transceiver device 300 further comprises the receiver device (Rx) 110 which includes CP removal block 501, the demodulator 407, the one-tap Equalizer unit 408 and the decision block 409.

The CP removal block 501 may be given by $[0_{K \times L} \ I_{K \times K}]$ where $I_{K \times K}$ is the identity matrix.

The demodulator 407, perform a demodulation based on constructing a matrix L which is a Lagrange matrix of size K×K. For example, it may construct a Lagrange matrix 111-L and may further perform a demodulation 112-L of a multicarrier modulated signal 102-V based on the a Lagrange matrix 111-L.

The one-tap equalizer 408 uses a K×K diagonal matrix, and its output is provided to the decision block 409.

Furthermore, a convolution of the modulation, channel, and demodulation, is given by Eq. 29:

$$\begin{bmatrix} r_{k-1,0} & r_{k-2,0} & \cdots & r_{0,0} \\ r_{k-1,1} & r_{k-2,1} & \cdots & r_{0,1} \\ \vdots & \vdots & \vdots & \vdots \\ r_{k-1,k-1} & r_{k-2,k-1} & \cdots & r_{0,k-1} \end{bmatrix} \begin{bmatrix} h_L & \cdots & h_0 & 0 & \cdots & 0 \\ 0 & \ddots & \ddots & \ddots & & \vdots \\ \vdots & \ddots & \ddots & \ddots & \ddots & 0 \\ 0 & \cdots & 0 & h_L & \cdots & h_0 \end{bmatrix}_{L:K \times K} \quad \text{Eq. 29}$$

$$\underbrace{\begin{bmatrix} \rho_0^{1-P} & \rho_1^{1-P} & \cdots & \rho_{k-1}^{1-P} \\ \rho_0^{2-P} & \rho_1^{2-P} & \cdots & \rho_{k-1}^{2-P} \\ \vdots & \vdots & \vdots & \vdots \\ 1 & 1 & 1 & 1 \end{bmatrix}}_{V:P \times K} = \begin{bmatrix} C(\rho_0) & & \\ & \ddots & \\ & & C(\rho_{k-1}) \end{bmatrix}$$

Note that, the following operations or conditions may be performed or satisfied. This result is true $\forall \rho_k \Rightarrow$ For example, the plurality of signature roots $\rho_k$ may further be determined (e.g., an operation to obtain or determine or choose the plurality of signature roots $\rho_k$).

If $C(\rho_k) \neq 0$, $\forall k \Rightarrow$ a perfect recovery condition may be satisfied.

It may be determined, e.g., how to choose the tuning factor (it may be depend on the signature roots) in order to satisfy the transmit power constraint, normalization of the modulator: Trace($V^H V$)=K.

Overall, it may further be determined, how to choose e.g., modify, optimize) the plurality of signature roots in order to boost the system performance (such as minimize the bit error rate (BER)).

The proposed multicarrier modulation scheme (e.g., the Vandermonde-Lagrange multicarrier modulation scheme presented in FIG. 5) may generalize the conventional CP-OFDM modulation scheme, and may further satisfy the PR condition.

As discussed above, the plurality of signature roots may be modified. However, if sending using K signature roots, the modification (e.g., optimization) may be carried out over $\mathbb{C}^K$ where the complexity increases with K.

This problem may be solved based on operations performed in the following two steps including step 1 and step 2:

Step I: choosing the plurality of signature roots.

For example, the plurality of signature roots ($\rho_k$) may be uniformly distributed on the circumference of the circle, e.g., uniformly spread over a circle of radius a, such that $$\rho_k = ae^{\frac{j2\pi k}{K}}.$$

In the embodiment of FIG. 5 in which the transceiver device is based on a VL Modulator, a Lagrange basis polynomials may be used at the receiver device, given by Eq. 30:

$$F_k(z) = \frac{\kappa}{K} \sum_{q=0}^{K-1} \rho_k^q z^{-q}, \text{ where } \kappa = K\sqrt{\frac{1-a^2}{1-a^{2K}}} \text{ tuning factor} \quad \text{Eq. 30}$$

Moreover, the Lagrange matrix L reduces to a Vandermonde, given by Eq. 31:

$$L = \frac{\kappa}{K}\begin{bmatrix} \rho_0^{K-1} & \rho_0^{K-2} & \cdots & 1 \\ \rho_1^{K-1} & \rho_1^{K-2} & \cdots & 1 \\ \vdots & \vdots & \cdots & \vdots \\ \rho_{K-1}^{K-1} & \rho_{K-1}^{K-2} & \cdots & 1 \end{bmatrix}, \quad \text{Eq. 31}$$

$$\underbrace{L\,V(L+1:P,\,:)}_{\text{after CP Rem}} = \kappa I, D = \kappa \underbrace{\begin{bmatrix} C(\rho_0) & & \\ & \ddots & \\ & & C(\rho_{K-1}) \end{bmatrix}}_{\text{Freq. response of the channel}}$$

Note that, $$a = \Rightarrow V = \underbrace{[0_L; I_K]F^H}_{\text{CP add}} \text{ and } L = F.$$

From the above operations it may be determined that the VL modulator (i.e., the Vandemonde-Lagnrange multicarrier modulation scheme of the invention) generalizes the conventional CP-OFDM multicarrier modulation scheme.

Similar to the embodiment of FIG. 4 (i.e., being based on the LV modulator), it may be derived that both LV and VL modulators end up with the same optimization metric's expression. A repeated derivation of equations for the VL modulator is omitted, as it can be derived by the skilled person.

Step 2: modifying the plurality of the signature roots

For example, the signature roots that uniformly spread over a circle of radius $a_{opt}$ may be used, and an algorithm may further be applied that may optimize the signature roots individually following a specific optimization metric. In particular, a machine learning techniques may be used in this step.

In the following this step is exemplarily referred to as the "signature roots refinement". A detailed description of this step is provided, e.g., in FIG. 7 and FIG. 12.

Figure 6:
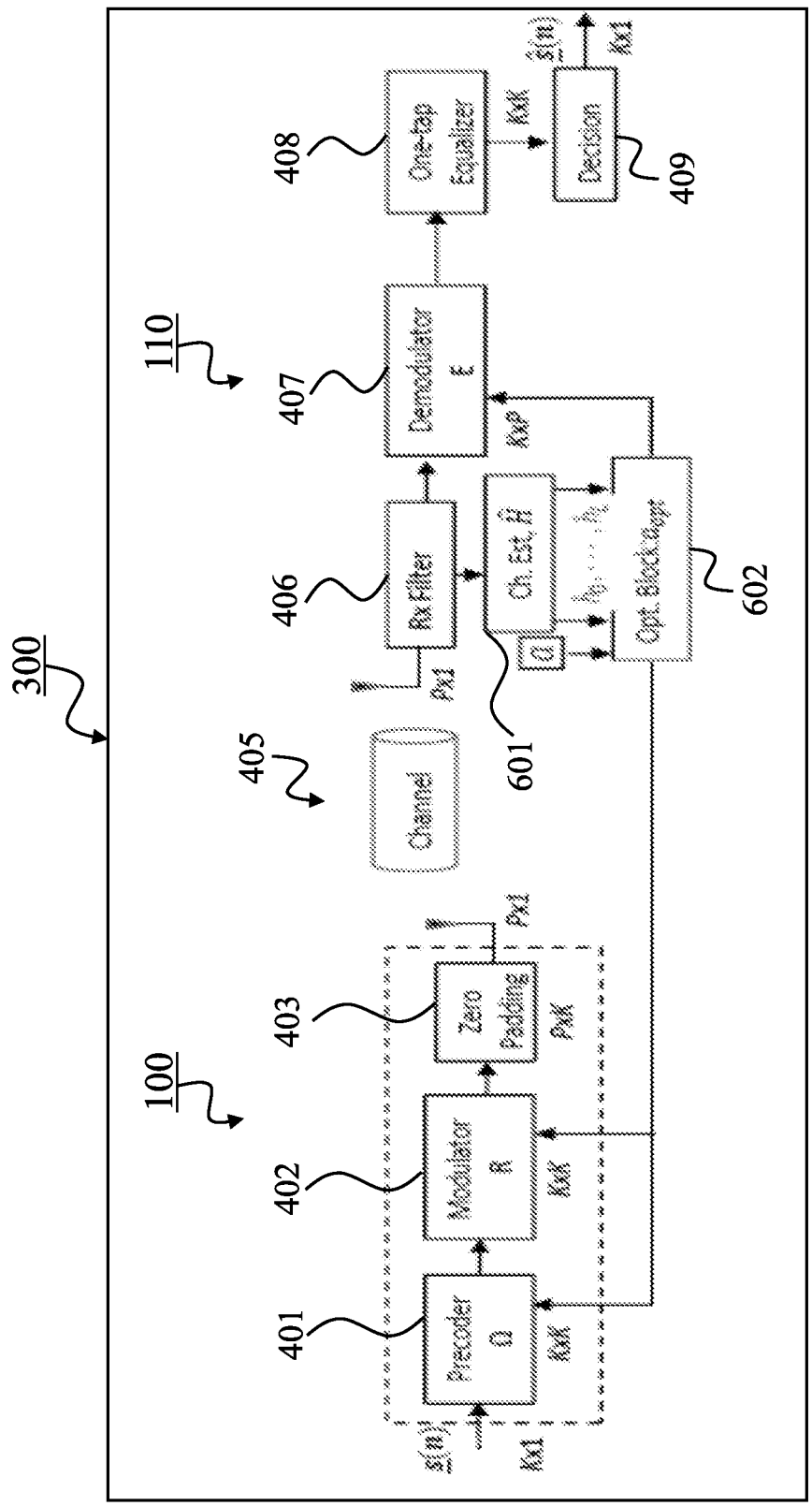
FIG. 6 is a schematic view for signaling exchange indicating a radius of a circle.

Reference is made to FIG. 6 which is a schematic view for signaling exchange indicating a radius $a_{opt}$ of a circle.

The present invention may provide (e.g., identify and propose) a new waveform that may satisfy the perfect recovery condition while keeping a low complex transceiver implementation. Without limiting the present invention, the signaling exchange indicating the radius of the circle is exemplarily discussed for a transceiver device 300 being based on a transceiver device 300 comprising a transmitter device 100 using a Lagrange matrix 101-L for modulation 102-L and a receiver device 110 using a Vandermonde matrix 111-V for demodulation 112-V. However, such a signaling exchange for a transceiver device 300 being based on a VL modulator can also be deduced accordingly and a repeated description (i.e., for a transceiver being based on a VL modulator) is omitted, since the VL modulator will follow same steps.

Step I: choosing the plurality of signature roots.

For example, the plurality of signature roots ($\rho_k$) may be uniformly distributed on the circumference of the circle, e.g., uniformly spread over a circle of radius a, such that $$\rho_k = ae^{\frac{j2\pi k}{K}}.$$

In the signalling exchange the following three operations may be performed.

1. For example, an optimization block 602 is provided that needs the channel state information (can be obtained from the channel estimation unit 601) in order to compute the optimization metric (e.g., the MSE detailed above), and it may further compute the $a_{opt}$.

2. Moreover, a signalling may be sent to feedback $a_{opt}$ to the transmitter device 100 which may be required for the modulator 402 and the precoder block 401.

3. Furthermore, the receiver device 110 may use the $a_{opt}$ to compute the demodulation matrix.

In some embodiments of the invention, the above mentioned step 1 (i.e., Step I: choosing the plurality of signature roots) may only be performed (i.e., the above step may be enough).

Figure 7:
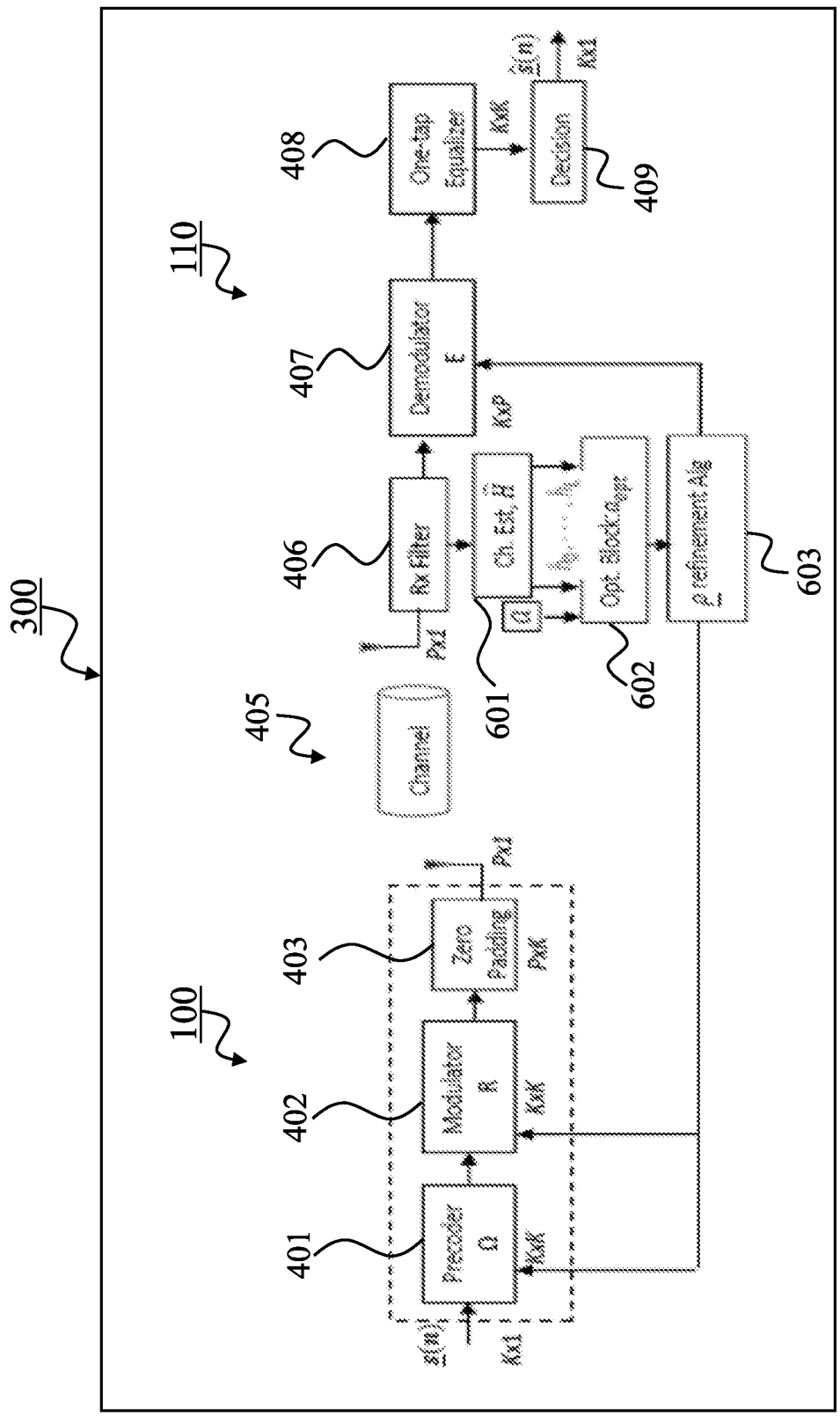
FIG. 7 is a schematic view for signaling exchange indicating the signature root refinement.

Moreover, in some embodiments, (e.g., depending on the use case), the above mentioned step 2 (i.e., Step 2: modifying the plurality of the signature roots) may further be performed, which is exemplarily discussed, e.g., in FIG. 7 and FIG. 12.

Reference is made to FIG. 7 which is a schematic view for signaling exchange indicating the signature root refinement.

Without the limiting the present invention, the signaling exchange indicating the signature root refinement is exemplarily discussed for a transceiver device 300 being based on a transceiver device 300 comprising a transmitter device 100 using a Lagrange matrix 101-L for modulation 102-L and a receiver device 110 using a Vandermonde matrix 111-V for demodulation 112-V. However, such a signaling exchange for a transceiver device 300 being based on a VL modulator can also be deduced accordingly and a repeated description (i.e., for a transceiver being based on a VL modulator) is omitted, since the VL modulator will follow same steps.

Step 2: modifying the plurality of the signature roots

For example, the signature roots that uniformly spread over a circle of radius $a_{opt}$ may be used, and an algorithm may further be applied that may optimize the signature roots individually following a specific optimization metric. In particular, a machine learning techniques may be used in this step. FIG. 7 illustrates the signalling exchange corresponding to the Step 2.

For the signalling exchange of the signature roots refinement, the following operations may be performed.

1. The optimization block 602 that needs the channel state information (which may be obtained using the channel estimation unit 601) in order to compute the optimization metric (for instance, the MSE detailed above) and it may further compute the $a_{opt}$.

2. Moreover, a refinement block 603 (for example, it may use a refinement algorithm) that needs to refine the signature roots individually following a specific optimization method and using a specific metric.

3. In addition, a signal may be sent, in order to feedback the modified signature roots ρ (vector of K complex values) to the transmitter device 100 which may be necessary for the modulator 402 and the precoder block 401.

4. Furthermore, the receiver device 100 may use the modified plurality of signature roots ρ to compute the demodulation matrix.

Figure 8B:
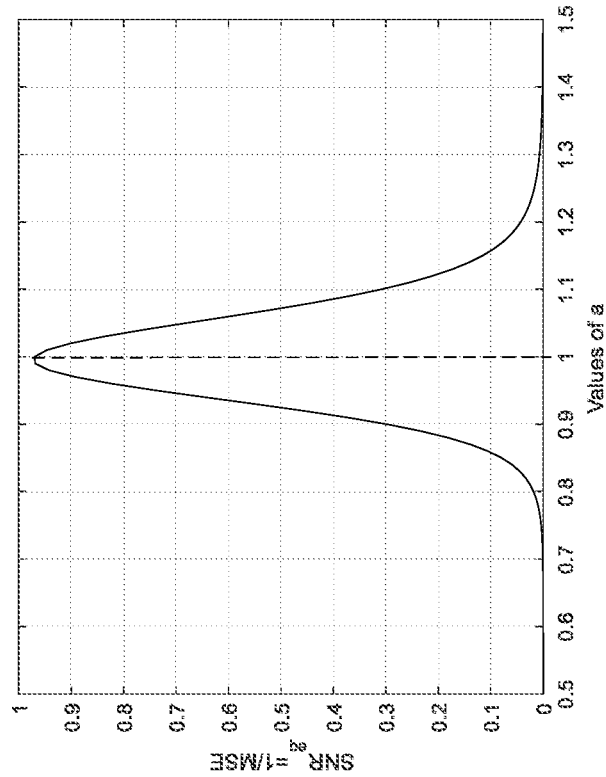
FIG. 8a and FIG. 8b illustrate two exemplarily channel realization.
Figure 8A:
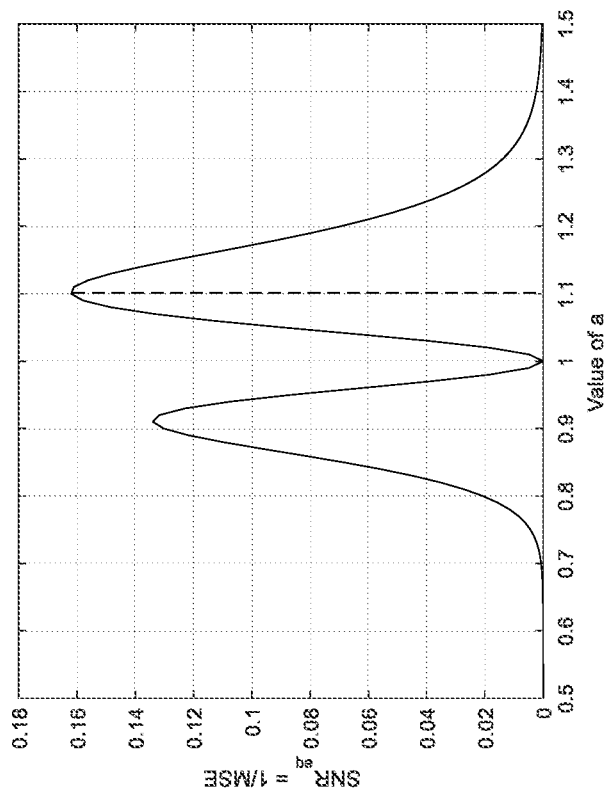

References are made from FIG. 8a and FIG. 8b which illustrate two exemplarily channel realization.

At a first step, the signature roots may be obtained (e.g., determined, generated) such that they are uniformly spread over a circle of radius a, for example, according to $$\rho_k = a e^{\frac{j2\pi k}{K}}.$$

The significance of $a_{opt}$ and its impact on the overall system performance is exemplarily described.

Channel realization 1: $C(z)=1+z^{-4}$

Channel realization 2: $C(z)=1-z+z^{-4}$

Furthermore, considering the optimization metric, the MSE (by using a uniform power allocation, therefore, same κ over the subcarriers may be applied).

In the example of channel realization 1 which is illustrated in FIG. 8a, the optimum radius is 1.1 (i.e., $a_{opt}$=1.1). Note that, if using the ZP-OFDM (a=1), the signal cannot be efficiently recovered since $$SNR_{eq} = \frac{1}{MSE}$$

is almost 0 (see FIG. 8a).

However, in the example of channel realization 2 which is illustrated in FIG. 8b, the best choice is when the radius is equal to 1, then the LV scheme reduces to the ZP-OFDM.

In the following, the performance results are presented, in terms of BER as a function of the signal-to-noise ratio (SNR).

Figure 9B:
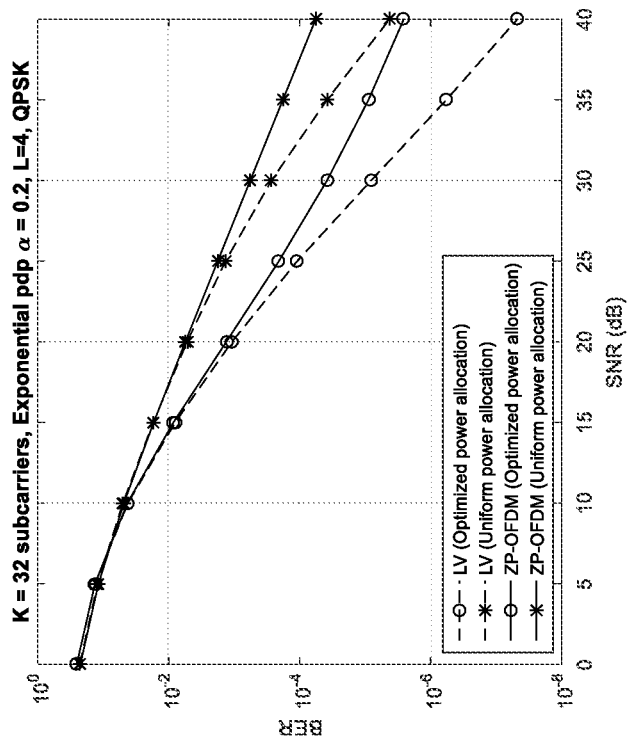
FIG. 9a and FIG. 9b illustrate the performance results for a uniform and an optimized power allocation at the transmitter device being based on a frequency selective channels with uniform (FIG. 9a) and exponential (FIG. 9 b) power delay profile.
Figure 9A:
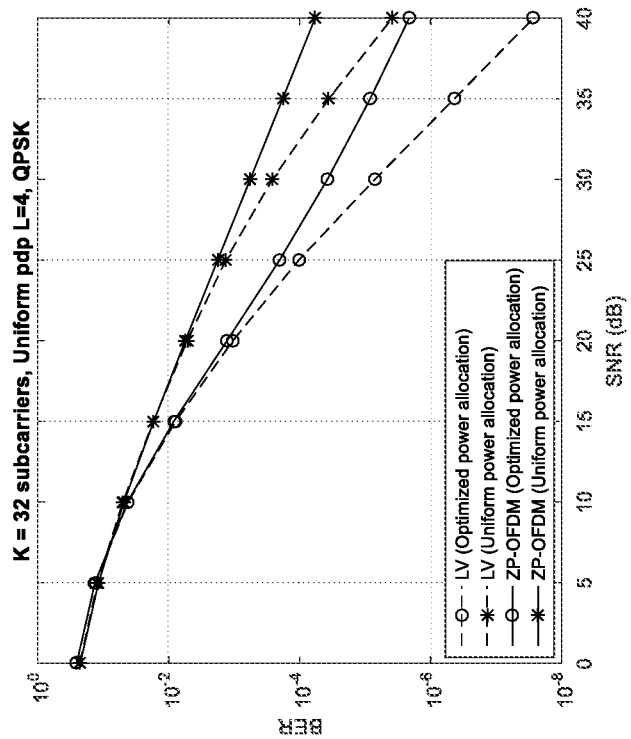

References are made from FIG. 9a and FIG. 9b which illustrate the performance results for a uniform and an optimized power allocation at the transmitter device based on a frequency selective channels with uniform (FIG. 9a) and exponential power delay profile (FIG. 9 b).

When using K=32 subcarriers, the channel spread L of 4 (i.e., L=4), and further carrying out the performance where the transmitter device uses the uniform and the optimized power allocation (for example, a precoder with different tuning factors) and assuming the frequency selective channels with uniform (e.g., FIG. 9a) and exponential power delay profile (pdp) (e.g., FIG. 9 b).

With reference to FIG. 9a (the uniform pdp) and FIG. 9b (Exponential pdp with factor α=0.2), it can be derived that, both of the LV scheme (represented by the dashed curves) including for the LV (uniform power allocation) and the LV (optimized power allocation) (e.g., always) outperforms the ZP-OFDM schemes (represented by the solid lines).

Moreover, the performance of both schemes increases when using the optimal power allocation.

FIG. 8a, FIG. 8b, FIG. 9a and FIG. 9b have been depicted using perfect channel state information (CSI) at the receiver device. In the following, the performance results are shown using imperfect CSI at the receiver device (i.e., channel estimation errors). Without limiting the present invention, the performance results (i.e., FIG. 10a and FIG. 10b) are presented for the frequency selective channels using uniform power delay profile.

Figure 10B:
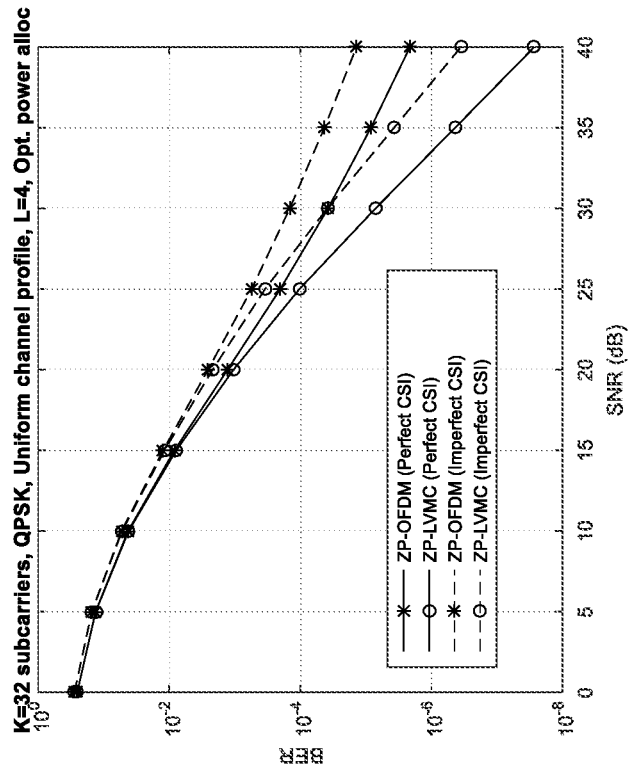
FIG. 10a and FIG. 10.b illustrate comparison of performance results under perfect and imperfect CSI, when the transmitter device is using a uniform power allocation (FIG. 10a) or an optimal power allocation (FIG. 10b).
Figure 10A:
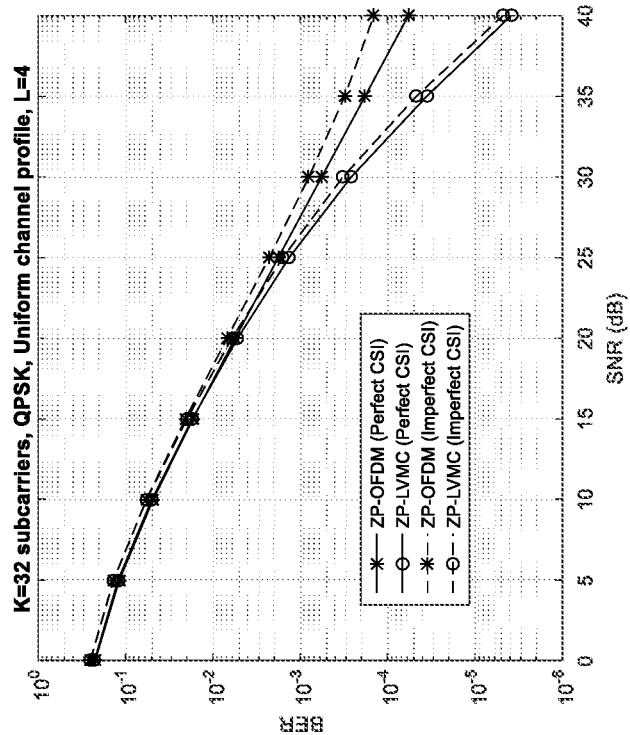

References are made from FIG. 10a and FIG. 10b which illustrate comparison of performance results under perfect and imperfect CSI, when the transmitter device is using uniform power allocation (FIG. 10a), and when the transmitter device is using optimal power allocation (FIG. 10b).

As can be derived from FIG. 10a and FIG. 10b, the LV modulation scheme outperforms the ZP-OFDM under the imperfect CSI conditions. This result also illustrates the robustness of the present invention to the channel conditions.

As discussed, in some embodiments, the signature roots may be modified (e.g., refined, migrated, optimized, etc.). For example, the "Step 2: modifying the plurality of the signature roots may be performed".

Figure 11B:
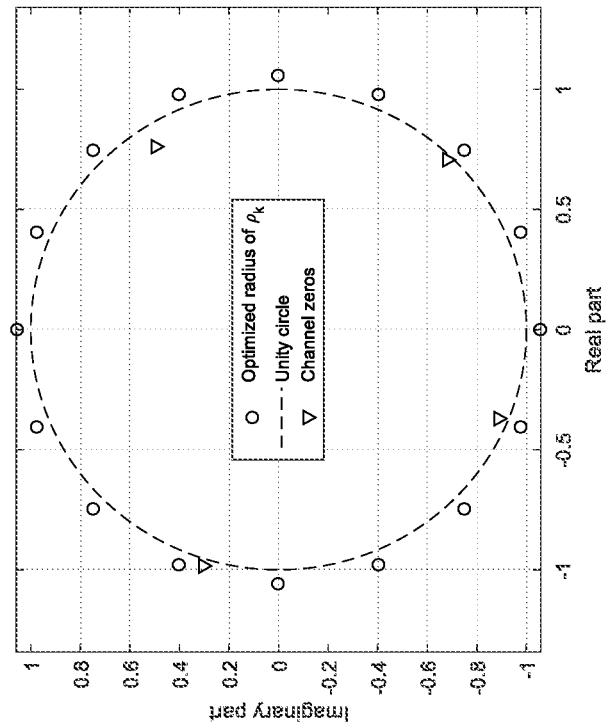
FIG. 11a and FIG. 11b illustrate determining a radius of a circle (FIG. 11a) and further determining the signature roots using the radius of the circle (FIG. 11b).
Figure 11A:
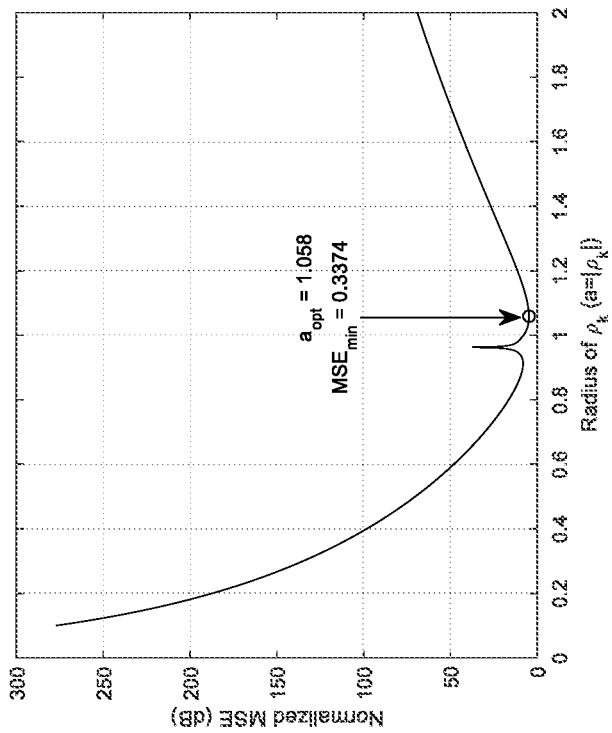

References are made from FIG. 11a and FIG. 11b which illustrate determining the radius of the circle (FIG. 11a) and further determining the signature roots using the radius of the circle (FIG. 11b).

For example, the Gradient descent algorithm may be used in order to perform the individual signature roots optimization (i.e., modifying the signature root). For instance, at first, the radius of the circle $a_{opt}$ may be used (i.e., which has been provided by Step 1) and considering the K=16 and the L=4 (e.g., the results given by Step 1). The determined radius of the circle in FIG. 11a may be used and the plurality of the signature roots may further be obtained (e.g., determined, generated, etc.), as it is illustrated in FIG. 11b.

Moreover, the plurality of the signature roots represented in FIG. 11b may further be modified (e.g., refined) using Gradient Descent algorithm (GDA). The results of signature roots refinement (using Step 2) are depicted in FIG. 12a and FIG. 12b, for the same channel realization.

Figure 12B:
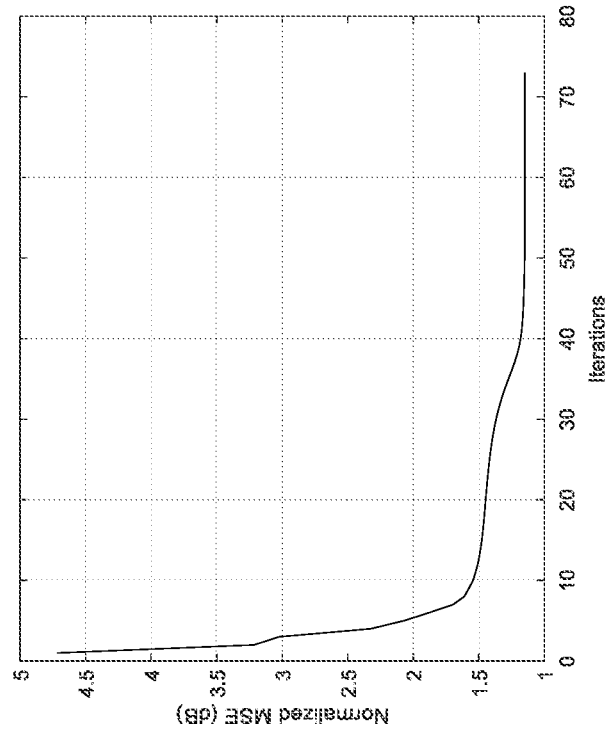
FIG. 12a and FIG. 12b illustrate modifying the plurality of signature roots, when the plurality of signature roots migrating toward new positions (FIG. 12a) and when the MSE decreases with the GDA iterations (FIG. 12b).
Figure 12A:
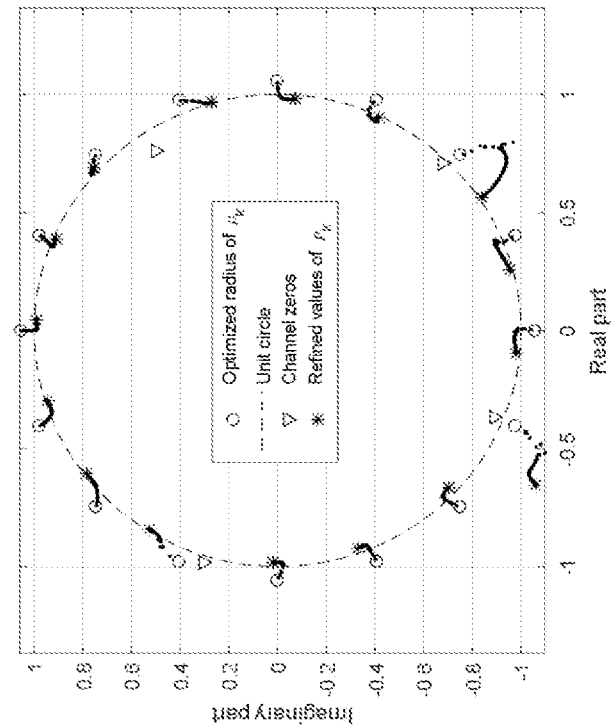

FIG. 12a shows the plurality of signature roots migrating toward new positions, and FIG. 12b shows the MSE decreasing with the GDA iterations.

As it can be derived from FIG. 12b, the MSE degrades while the GDA algorithm is optimizing the plurality of the signature roots positions from an iteration to another.

Figure 13:
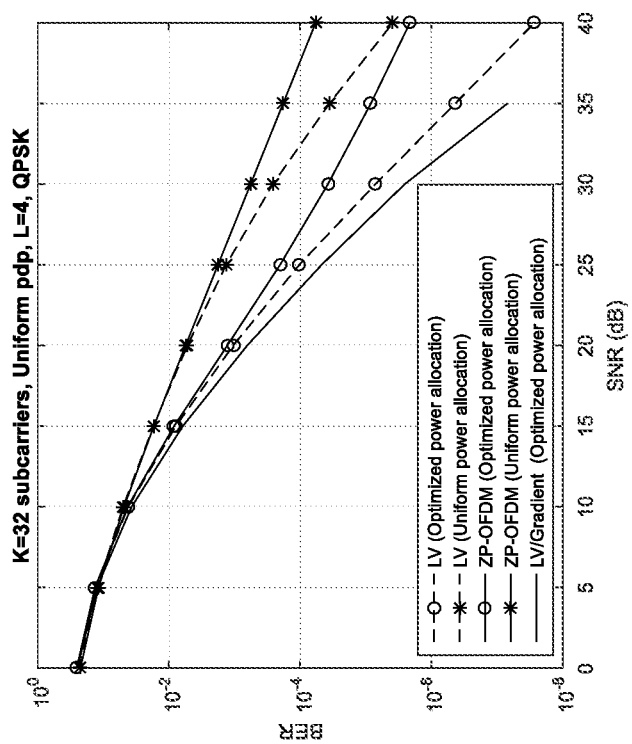
FIG. 13 shows the overall performance of the LV modulator of the invention compared to the performance of a conventional ZP-OFDM.

FIG. 13 shows the overall performance of the LV modulator of the invention compared to the conventional ZP-OFDM performance.

The comparison of the performance is performed based on considering K=32, L=4, and using frequency selective channel following a uniform pdp (the results can be derived for a more general channel). Moreover, the comparison of performance results is performed using Step 1 only, and step 1 along with the Step 2 (which uses Step 1 as an intermediate results).

A performance gain of 5 dB at $10^{-5}$ may be obtained (using Step 1 with optimized power allocation)

2 dB additional gains may be obtained when using Step 2, signature roots refinement.

LV multicarrier modulation scheme of the present invention outperforms the ZP-OFDM.

Figure 14:
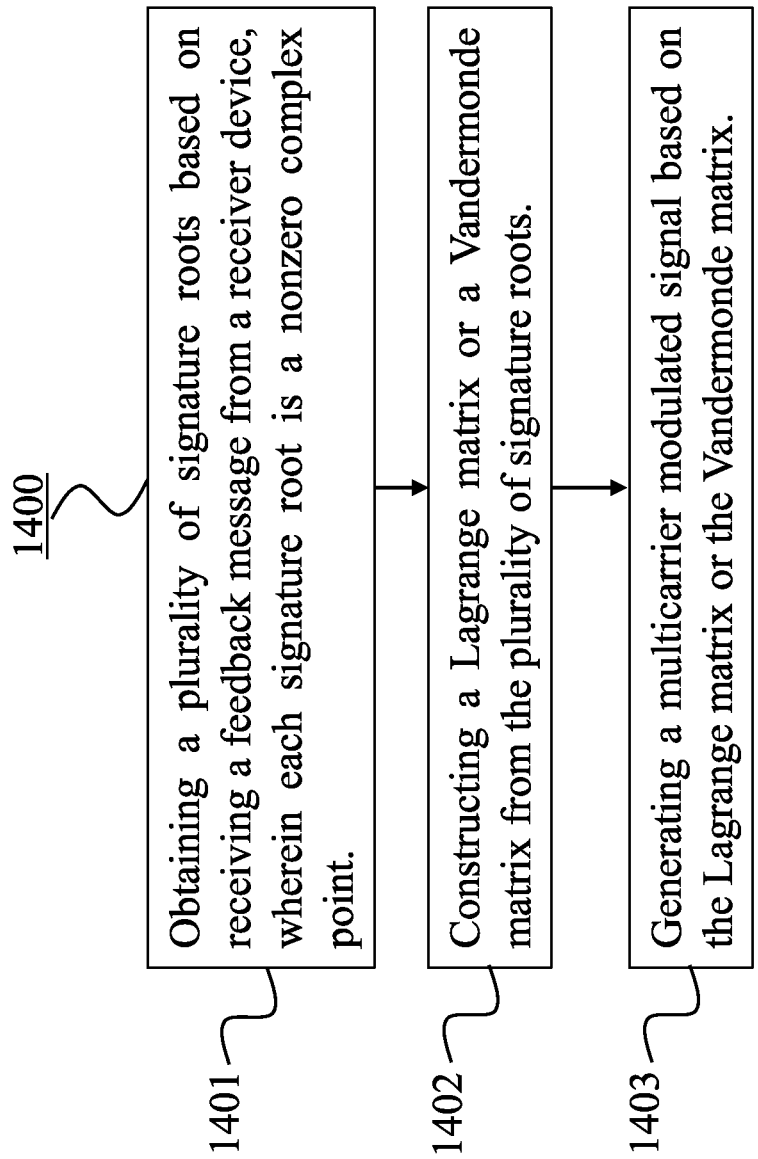
FIG. 14 is a flowchart of a method for being implemented at a transmitter device, according to an embodiment of the invention.

FIG. 14 shows a method 1400 according to an embodiment of the invention for being implemented at a transmitter device 100. The method 1400 may be carried out by the transmitter device 100, as it described above.

The method 1400 comprises a step 1401 of obtaining a plurality of signature roots $\rho_k$ based on receiving a feedback message 11 from a receiver device 110, wherein each signature root is a nonzero complex point.

The method 1400 further comprises a step 1402 of constructing a Lagrange matrix 101-L or a Vandermonde matrix 101-V from the plurality of signature roots $\rho_k$.

The method 1400 further comprises a step 1403 of generating a multicarrier modulated signal 102-L, 102-V based on the Lagrange matrix 101-L or the Vandermonde matrix 101-V.

Figure 15:
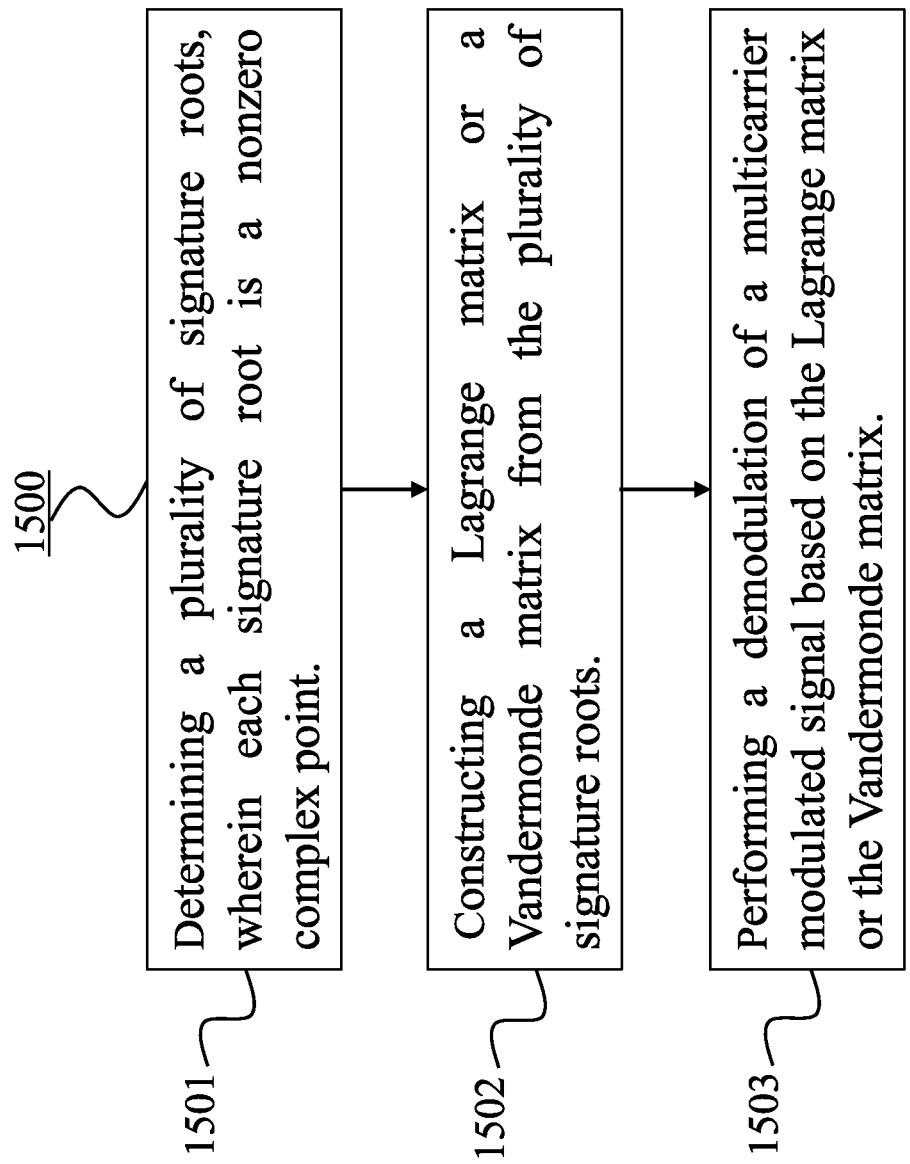
FIG. 15 is a flowchart of a method for being implemented at a receiver device, according to an embodiment of the invention.

FIG. 15 shows a method 1500 according to an embodiment of the invention for being implemented at a receiver device 110. The method 1500 may be carried out by the receiver device 110, as it described above.

The method 1500 comprises a step 1501 of determining a plurality of signature roots $\rho_k$, wherein each signature root is a nonzero complex point;

The method 1500 further comprises a step 1502 of constructing a Lagrange matrix 111-L or a Vandermonde matrix 111-V from the plurality of signature roots $\rho_k$.

The method 1500 further comprises a step 1503 of performing a demodulation 112-L, 112-V of a multicarrier modulated signal 102-V, 102-L based on the Lagrange matrix 111-L or the Vandermonde matrix 111-V.

Figure 16:
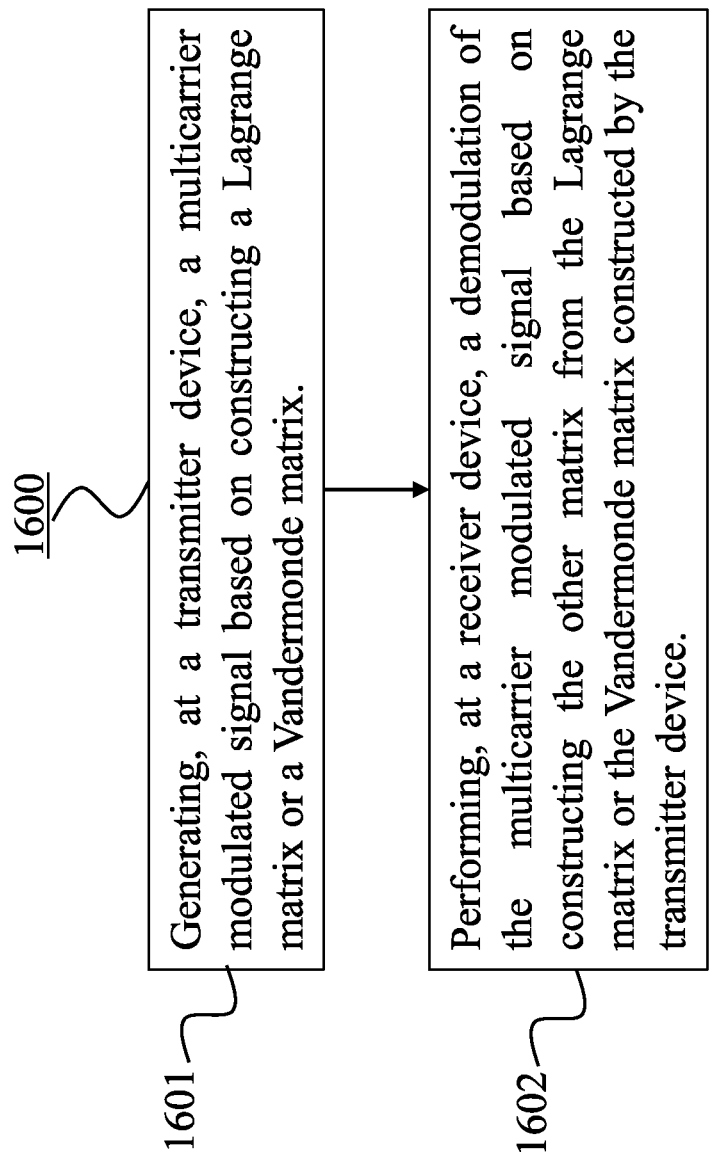
FIG. 16 is a flowchart of a method for being implemented at a transceiver device, according to an embodiment of the invention.
Figure 17:
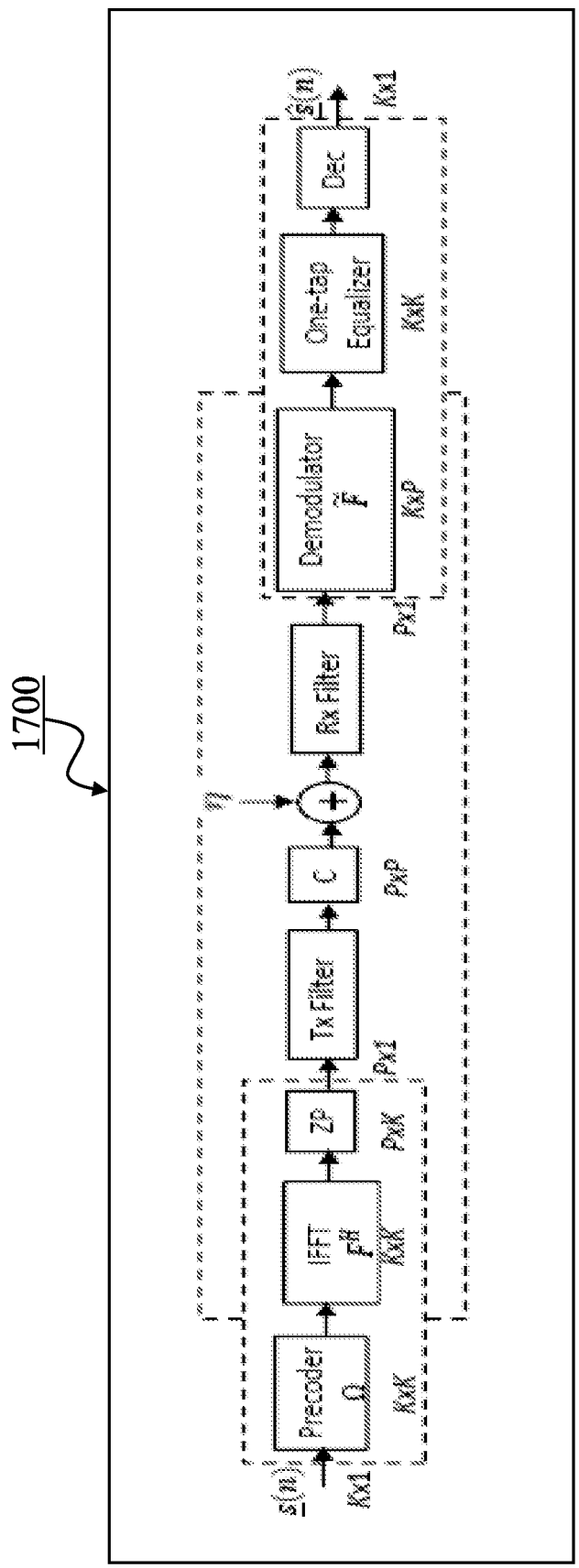
FIG. 17 schematically illustrates a conventional Zero Padding Orthogonal Frequency Division Multiplexing (ZP-OFDM) block diagram.
Figure 18:
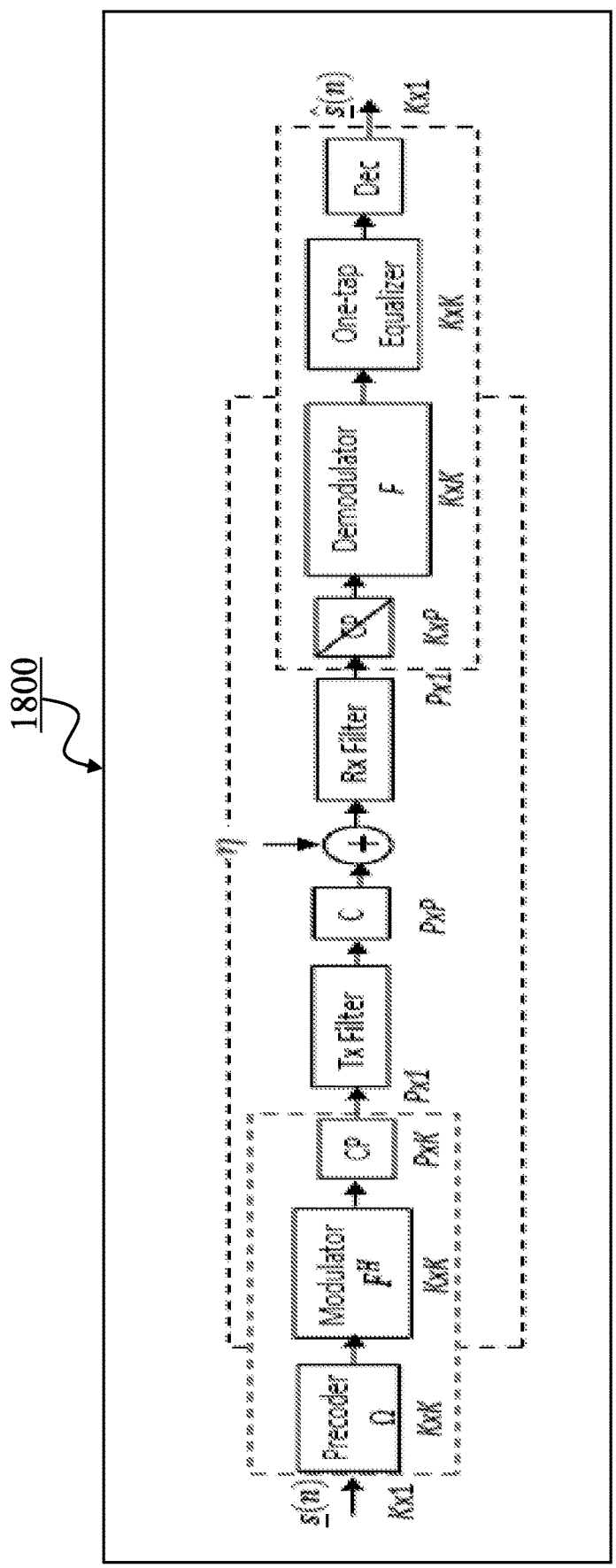
FIG. 18 schematically illustrates a conventional Cyclic Prefix Orthogonal Frequency Division Multiplexing (CP-OFDM) block diagram.

FIG. 16 shows a method 1600 according to an embodiment of the invention for being implemented at a transceiver device 300. The method 1600 may be carried out by the transceiver device 300, as it described above.

The method 1600 comprises a step 1601 of generating, at a transmitter device 100, a multicarrier modulated signal 102-L, 102-V based on constructing a Lagrange matrix 101-L or a Vandermonde matrix 101-V.

The method 1600 further comprises a step 1602 of performing, at a receiver device 110, a demodulation 112-V, 112, L of the multicarrier modulated signal 102-L, 102-V based on constructing the other matrix 111-V, 111-L from the Lagrange matrix or the Vandermonde matrix constructed by the transmitter device 100.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitter device for a multicarrier modulation scheme, the transmitter device configured to:
    obtain a plurality of signature roots ($\rho_k$) based on a feedback message received from a receiver device, wherein each signature root of the plurality of signature roots ($\rho_k$) is a nonzero complex point;
    construct, from the plurality of signature roots ($\rho_k$), at least one of a Lagrange matrix or a Vandermonde matrix;
    allocate a determined transmit power to each subcarrier of a multicarrier modulated signal according to normalization of transmitter device filter energy;
    generate the multicarrier modulated signal based on at least one of the Lagrange matrix or the Vandermonde matrix and further based on the determined transmit power of each subcarrier; and
    transmit the multicarrier modulated signal to a receiver device.

2. The transmitter device according to claim 1, wherein the feedback message indicates a radius (a) of a circle, wherein signature roots of the plurality of signature roots ($\rho_k$) are uniformly distributed on a circumference of the circle.

3. The transmitter device according to claim 2, wherein the transmitter device being configured to allocate the determined transmit power to each subcarrier comprises the transmitter device being configured to:
    allocate the determined transmit power to each subcarrier of the multicarrier modulated signal according to a tuning factor ($\kappa_k$) estimated based on the radius (a) of the circle.

4. The transmitter device according to claim 2, wherein the plurality of signature roots ($\rho_k$) are obtained based on $$\rho_k = ae^{\frac{j2\pi k}{K}}$$

wherein $\rho_k$ corresponds to a signature root related to the $k^{th}$ subcarrier, wherein a corresponds to the radius of the circle, and wherein K is the number of the subcarriers.

5. The transmitter device according to claim 1, wherein the feedback message indicates at least one vector for the plurality of signature roots ($\rho_k$).

6. The transmitter device according to claim 1, wherein the transmitter device is further configured to perform at least one of:
    perform, in response to constructing the Lagrange matrix, a zero-padding procedure on the multicarrier modulated signal; or
    perform, in response to constructing the Vandermonde matrix, a cyclic-prefix procedure on the multicarrier modulated signal.

7. A receiver device for a multicarrier modulation scheme, the receiver device configured to:
    determine a plurality of signature roots ($\rho_k$), wherein each signature root is a nonzero complex point;
    construct, from the plurality of signature roots ($\rho_k$), at least one of a Lagrange matrix or a Vandermonde matrix;
    receive a multicarrier modulated signal transmitted by a transmitter device with transmit power allocated to each subcarrier of the multicarrier modulated signal according to normalization of transmitter device filter energy; and perform demodulation of the multicarrier modulated signal based on the at least one of the Lagrange matrix or the Vandermonde matrix.

8. The receiver device according to claim 7, wherein the receiver device is further configured to:

determine a radius (a) of a circle based on channel state information of a communication channel, wherein signature roots of the plurality of signature roots ($\rho_k$) are uniformly distributed on a circumference of the circle.

9. The receiver device according to claim 8, wherein the receiver device is further configured to:

send, to a transmitter device, a feedback message indicating the radius (a) of the circle.

10. The receiver device according to claim 8, wherein the receiver device is further configured to:

compute, based on the channel state information of the communication channel, a metric for evaluating at least one of the radius (a) of the circle or the plurality of signature roots ($\rho_k$).

11. The receiver device according to claim 7, wherein the receiver device is further configured to:

modify, individually, each signature root from the plurality of signature roots ($\rho_k$) based on a machine learning algorithm, using a gradient descent algorithm.

12. The receiver device according to claim 11, wherein the receiver device is further configured to:

determine at least one vector for the plurality of signature roots ($\rho_k$) based on the individual modification of each signature root; and send a feedback message to the transmitter device indicating the at least one vector for the plurality of signature roots ($\rho_k$).

13. The receiver device according to claim 7, wherein performing the demodulation of the multicarrier modulated signal results in a demodulated signal; and wherein the receiver device is further configured to:
perform a one-tap equalization on the demodulated signal based on the plurality of signature roots ($\rho_k$).

14. A system comprising:

a transmitter configured to:
obtain a plurality of first signature roots ($\rho_k$) based on a feedback message received from a receiver device, wherein each signature root of the plurality of signature roots ($\rho_k$) is a nonzero complex point;
construct, from the plurality of first signature roots ($\rho_k$), at least one of a first Lagrange matrix or a first Vandermonde matrix;
allocate a determined transmit power to each subcarrier of a multicarrier modulated signal according to normalization of transmitter device filter energy;
generate the multicarrier modulated signal based on the at least one of the first Lagrange matrix or the first Vandermonde matrix and further based on the determined transmit power of each subcarrier; and
transmit the first multicarrier modulated signal to a receiver device; and the receiver device configured to:
determine a plurality of second signature roots ($\rho_k$), wherein each signature root of the plurality of second signature roots ($\rho_k$) is a nonzero complex point;
construct, from the second plurality of signature roots ($\rho_k$), at least one of a second Lagrange matrix or a second Vandermonde matrix;

receive the multicarrier modulated signal transmitted by the transmitter device with transmit power allocated to each subcarrier of the second multicarrier modulated signal according to normalization of transmitter device filter energy; and
perform demodulation of the multicarrier modulated signal based on the at least one of the second Lagrange matrix or the second Vandermonde matrix.

15. A system for a multicarrier modulation scheme, the system comprising:

a transmitter device configured to allocate a determined transmit power to each subcarrier of a multicarrier modulated signal according to normalization of transmitter device filter energy, and further configured to generate the multicarrier modulated signal based on constructing at least a first matrix that is one of a Lagrange matrix or a first Vandermonde matrix and further based on the determined transmit power of each subcarrier, and wherein the transmitter device is further configured to transmit the first multicarrier modulated signal to a receiver device; and the receiver device, configured to receive the multicarrier modulated signal transmitted by the transmitter device with transmit power allocated to each subcarrier of the second multicarrier modulated signal according to normalization of transmitter device filter energy, and further configured to perform a demodulation of the multicarrier modulated signal based on constructing a second matrix that is at least one of the Lagrange matrix or the Vandermonde matrix and that is different from the first matrix constructed by the transmitter device.

16. A method, comprising:

obtaining, by a transmitter device, a plurality of signature roots ($\rho_k$) based on a feedback message received from a receiver device, wherein each signature root of the plurality of signature roots ($\rho_k$) is a nonzero complex point;

constructing, from the plurality of signature roots ($\rho_k$), at least one of a Lagrange matrix or a Vandermonde matrix;

allocate a determined transmit power to each subcarrier of a multicarrier modulated signal according to normalization of transmitter device filter energy;

generating the multicarrier modulated signal based on the at least one of the Lagrange matrix or the Vandermonde matrix and further based on the determined transmit power of each subcarrier; and transmitting the multicarrier modulated signal to a receiver device.

17. A method, comprising:

determining a plurality of signature roots ($\rho_k$), wherein each signature root of the plurality of signature roots ($\rho_k$) is a nonzero complex point;

constructing, from the plurality of signature roots ($\rho_k$), at least one of a Lagrange matrix or a Vandermonde matrix;

receiving a multicarrier modulated signal transmitted by a transmitter device with transmit power allocated to each subcarrier of the multicarrier modulated signal according to normalization of transmitter device filter energy and performing demodulation of a multicarrier modulated signal based on the at least one of the Lagrange matrix or the Vandermonde matrix.

18. A method, comprising:
- allocating, at a transmitter device, a determined transmit power to each subcarrier of a multicarrier modulated signal according to normalization of transmitter device filter energy;
- generating, at the transmitter device, a multicarrier modulated signal based on a first matrix that is at least one of a Lagrange matrix or a Vandermonde matrix constructed by the transmitter device, and further based on the determined transmit power of each subcarrier;
- transmitting, by the transmitter device, the first multicarrier modulated signal to a receiver device;
- receiving, at the receiver device, the multicarrier modulated signal transmitted by the transmitter device with transmit power allocated to each subcarrier of the second multicarrier modulated signal according to normalization of transmitter device filter energy; and
- performing, at the receiver device, demodulation of the multicarrier modulated signal based on a second matrix that is at least one of the Lagrange matrix or the Vandermonde matrix constructed by the receiver device and that is different from the first matrix.

\* \* \* \* \*